United States Patent
Wynne et al.

(10) Patent No.: US 11,820,073 B2
(45) Date of Patent: *Nov. 21, 2023

(54) CLOSED LOOP PRINT PROCESS ADJUSTMENT BASED ON REAL TIME FEEDBACK

(71) Applicant: Intrepid Automation, San Diego, CA (US)

(72) Inventors: Ben Wynne, Escondido, CA (US); Robert Lee Mueller, San Diego, CA (US); Jamie Lynn Etcheson, San Diego, CA (US); Christopher Sean Tanner, Idyllwild, CA (US); Ivan Dejesus Chousal, Chula Vista, CA (US)

(73) Assignee: Intrepid Automation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,668

(22) Filed: Aug. 23, 2022

(65) Prior Publication Data

US 2022/0402199 A1 Dec. 22, 2022

Related U.S. Application Data

(60) Continuation of application No. 16/867,742, filed on May 6, 2020, now Pat. No. 11,465,340, which is a (Continued)

(51) Int. Cl.
*B29C 64/129* (2017.01)
*B33Y 10/00* (2015.01)
(Continued)

(52) U.S. Cl.
CPC ............ *B29C 64/129* (2017.08); *B29C 64/20* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/135; B29C 64/129; B29C 64/40; B29C 64/393; B29C 64/379;
(Continued)

(56) References Cited

U.S. PATENT DOCUMENTS 9,453,142 B2 9/2016 Rolland et al.
2006/0156978 A1 7/2006 Lipson et al.
(Continued)

FOREIGN PATENT DOCUMENTS

CN 106881863 A 6/2017
CN 108081596 A 5/2018
(Continued)

OTHER PUBLICATIONS

International Search Report dated Oct. 18, 2019 for PCT Patent Application No. PCT/US2019/038280.
(Continued)

*Primary Examiner* — Stella K Yi
(74) *Attorney, Agent, or Firm* — MLO, a professional corp.

(57) ABSTRACT

In some embodiments, a photoreactive 3D printing system includes: a moveable print platform; a resin tub comprising a membrane; a tension apparatus; a volume of resin contained within the resin tub; an illumination system; a print platform force sensor; and a print recipe comprising information for layers in a 3D printed part to be built on the print platform. In some embodiments, the photoreactive 3D printing system is configured to: project an image through the membrane at a polymer interface using the illumination system; moving the print platform in a z-direction; apply a tensioning force using the tension apparatus to induce a membrane tension on the membrane; measure an amount of print platform force using the print platform force sensor; and update the print platform movement in the print recipe
(Continued)

during a printing run based on the amount of print platform force measured by the print platform force sensor.

16 Claims, 14 Drawing Sheets

Related U.S. Application Data division of application No. 16/447,654, filed on Jun. 20, 2019, now Pat. No. 10,647,055.

(60) Provisional application No. 62/692,196, filed on Jun. 29, 2018.

(51) Int. Cl.
*B29C 64/393* (2017.01)
*B33Y 50/02* (2015.01)
*B29C 64/20* (2017.01)
*B33Y 30/00* (2015.01)

(58) Field of Classification Search
CPC ... B29C 64/307; B29C 64/277; B29C 64/268; B29C 64/264; B29C 64/245; B29C 64/205; B29C 64/20; B29C 64/194; B29C 64/176; B29C 64/171; B29C 64/165; B29C 64/124; B29C 64/112; B29C 64/106; B29C 64/10; B33Y 50/02; B33Y 30/00; B33Y 10/00
See application file for complete search history.

(56) References Cited

U.S. PATENT DOCUMENTS

| | | | |
|---|---|---|---|
| 2009/0020901 | A1 | 1/2009 | Schillen et al. |
| 2009/0289384 | A1 | 11/2009 | Maalderink et al. |
| 2015/0328839 | A1 | 11/2015 | Willis et al. |
| 2015/0331402 | A1 | 11/2015 | Lin et al. |
| 2016/0137839 | A1 | 5/2016 | Rolland et al. |
| 2016/0264696 | A1 | 9/2016 | Jeng et al. |
| 2016/0368210 | A1 | 12/2016 | Chen et al. |
| 2017/0052531 | A1 | 2/2017 | Minardi et al. |
| 2017/0210064 | A1 | 7/2017 | Aw et al. |
| 2017/0297099 | A1 | 10/2017 | Gibson et al. |
| 2017/0297261 | A1 | 10/2017 | Schultheiss et al. |
| 2018/0029296 | A1 | 2/2018 | Esbroeck et al. |
| 2018/0236710 | A1 | 8/2018 | Turner |
| 2019/0077085 | A1 | 3/2019 | Jau et al. |
| 2019/0184630 | A1 | 6/2019 | Turner et al. |

FOREIGN PATENT DOCUMENTS

| | | |
|---|---|---|
| JP | 2011504819 A | 2/2011 |
| JP | 2018039188 A | 3/2018 |
| WO | 2011098609 A1 | 8/2011 |
| WO | 2014126834 A2 | 8/2014 |
| WO | 2015195924 A1 | 12/2015 |
| WO | 2017106895 A1 | 6/2017 |
| WO | 2018016668 A1 | 1/2018 |
| WO | 2018062002 A1 | 4/2018 |

OTHER PUBLICATIONS

Notice of Allowance and Fees dated Dec. 13, 2021 for U.S. Appl. No. 16/949,712.
Notice of Allowance and Fees dated May 23, 2022 for U.S. Appl. No. 16/867,742.
Office Action dated Feb. 8, 2022 for U.S. Appl. No. 16/867,742.
Office Action dated Jul. 7, 2021 for U.S. Appl. No. 16/949,712.
Office Action dated Mar. 10, 2021 for U.S. Appl. No. 16/949,712.
Office Action dated May 18, 2022 for China Patent Application No. 201980044003.6.
Partial European Search Report dated May 6, 2022 for European Patent Office Patent Application No. 19827512.5.
Tianjiao Wang, et al., "In-situ Droplet Inspection and Control System for Liquid Metal Jet 3D Printing Process," Science Direct, vol. 10, 2017, pp. 968-981.
European Search Report dated Aug. 19, 2022 for European Patent Office Patent Application No. 19827512.5.

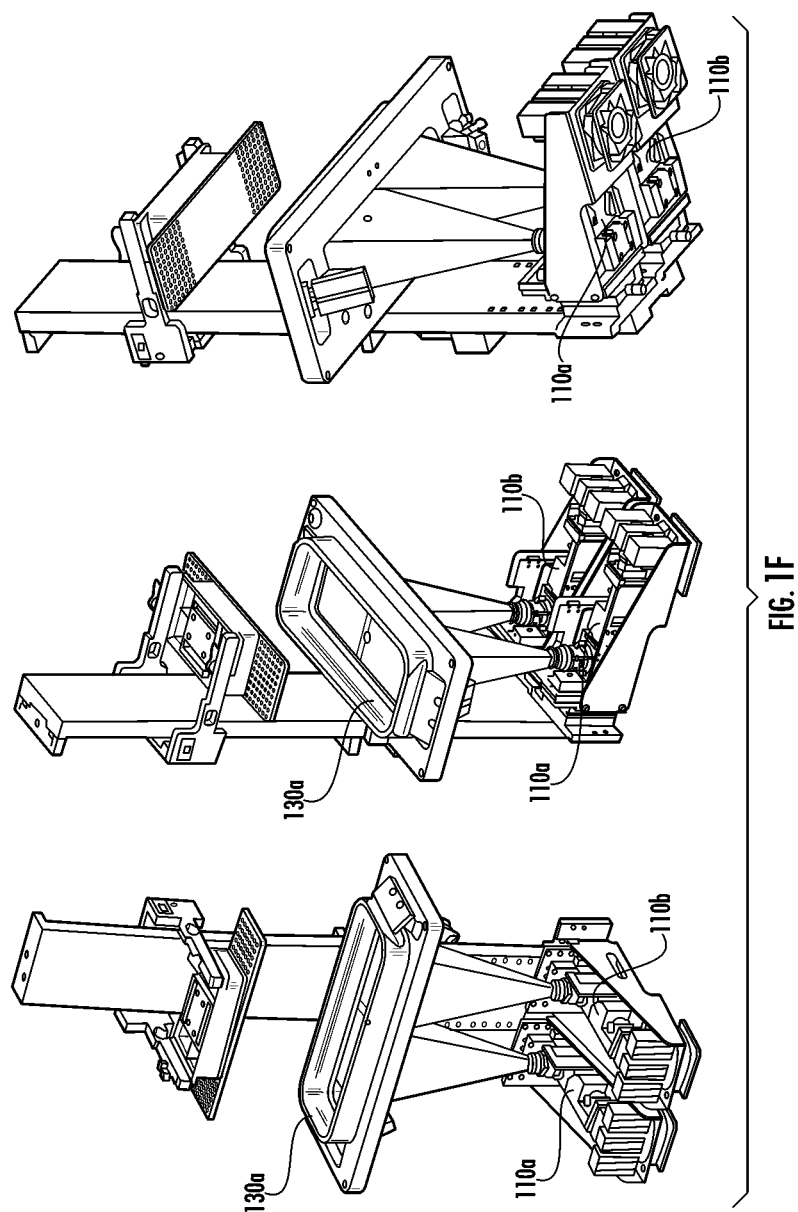

CLOSED LOOP PRINT PROCESS ADJUSTMENT BASED ON REAL TIME FEEDBACK

RELATED APPLICATIONS

This application is a continuation of U.S. patent application Ser. No. 16/867,742, filed on May 6, 2020, and entitled "Closed Loop Print Process Adjustment Based On Real Time Feedback"; which is a divisional of U.S. patent application Ser. No. 16/447,654, filed on Jun. 20, 2019, and entitled "Closed Loop Print Process Adjustment Based On Real Time Feedback"; which claims priority from U.S. Provisional Patent Application No. 62/692,196, filed on Jun. 29, 2018, and entitled "Closed Loop Print Process Adjustment Based On Real Time Feedback"; which are hereby incorporated by reference for all purposes.

BACKGROUND

There are many types of additive manufacturing (i.e., 3D printing) systems and methods. One method utilizes photosensitive polymers (i.e., photopolymers) that cross-link and harden from a liquid resin to a solid polymeric material upon exposure to light. These photoreactive 3D printing systems typically include a resin pool, an illumination system, and a print platform, where the illumination system projects an image into the resin pool causing a layer of a polymeric object to be formed on the print platform. The print platform then moves the printed layer out of the focal plane of the illumination system, and then the next layer is exposed (i.e., printed).

Conventional photoreactive 3D printing systems operate in an open loop manner relying on fixed process settings that cater to a general purpose use case. This solution results in poor product performance and produces parts of low quality in a non-repeatable manner. In some cases, process adjustments are made to enable a challenging use case that, when applied to other use cases, render the system performance well below optimal for general less challenging use cases. Another conventional approach is to optimize a specific set of printing process parameters for each individual print job. As the number of parameters available to optimize the printing process is quite large, the effort required to create a tuned process for each job can be extensive. The use of a trial and error approach is often employed. The results of this approach to print process optimization is only marginally effective in translating into a successful final product as the conditions existing during the process development work are rarely present during the final part production. Additionally, since the resulting problems with part quality are not detected during the printing process itself, subsequent print jobs and even entire production runs may be completed with the errors going undetected thus rendering all output as scrap and the machine time as lost work. In many cases, there is also a trade-off between printing speed and printed object quality, which is difficult to optimize for different use cases.

SUMMARY

In some embodiments, a method comprises providing a photoreactive 3D printing system, the system comprising: a chassis; an elevator system movably coupled to the chassis, wherein the elevator system comprises elevator arms; a print platform mounted to the elevator arms; a resin tub, wherein the resin tub comprises a membrane, and the membrane rests on a physical tension element such that increasing downward force on the resin tub induces increasing tension on the membrane; a membrane tension apparatus which applies a downward force on the resin tub; a resin pool confined by the resin tub and the membrane; an illumination system; a plurality of sensors comprising a resin bulk temperature sensor; and a print recipe comprising information for each layer in a 3D printed part to be built on the print platform. The print recipe comprises one or more of build geometry, illumination energy, exposure time per layer, wait time between layers, print platform position, print platform velocity, print platform acceleration, resin tub position, resin tub force, resin chemical reactivity, and resin viscosity. The method further comprises: projecting an image through the membrane and focused at a polymer interface located within the resin pool using the illumination system; moving the print platform in a z-direction with the print platform velocity and the print platform acceleration using the elevator system; applying a downward force to the resin tub to induce a membrane tension on the membrane; measuring a resin bulk temperature using the resin bulk temperature sensor; and updating the print platform velocity and the print platform acceleration in the print recipe during a printing run based on the resin bulk temperature of the resin pool.

In some embodiments, a photoreactive 3D printing system comprises: a chassis; an elevator system movably coupled to the chassis, wherein the elevator system comprises elevator arms; a print platform mounted to the elevator arms; a resin tub, wherein the resin tub comprises a membrane, and the membrane rests on a physical tension element such that increasing downward force on the resin tub induces increasing tension on the membrane; a membrane tension apparatus which applies a downward force on the resin tub; a resin pool confined by the resin tub and the membrane; an illumination system; a plurality of sensors; and a print recipe comprising information for each layer in a 3D printed part to be built. The plurality of sensors comprises at least two of: a z-stage position sensor; a z-stage velocity sensor; a resin tub vertical displacement sensor; an elevator arm load sensor; an accelerometer; a resin bulk temperature sensor; and a thermal imaging system. The print recipe comprises one or more of build geometry, illumination energy, exposure time per layer, wait time between layers, print platform position, print platform velocity, print platform acceleration, resin tub position, resin tub force, resin chemical reactivity, and resin viscosity. The print recipe is updated during a printing run based on input from at least two sensors of the plurality of sensors.

In some embodiments, a method comprises: providing a photoreactive 3D printing system comprising: a print platform, wherein the print platform is moveable; a resin tub, wherein the resin tub comprises a membrane; a tension apparatus; a volume of resin contained within the resin tub; an illumination system; a print platform force sensor; and a print recipe comprising information for layers in a 3D printed part to be built on the print platform, wherein the print recipe comprises one or more of build geometry, illumination energy, exposure time per layer, wait time between layers, print platform position, print platform movement, print platform velocity, print platform acceleration, resin tub position, resin tub force, resin chemical reactivity, and resin viscosity. The method further comprises: projecting an image through the membrane at a polymer interface located within the volume of resin using the illumination system; moving the print platform in a z-direction; applying a tensioning force using the tension apparatus to induce a membrane tension on the membrane; measuring an amount of print platform force on the print platform using the print platform force sensor; and updating the print platform movement in the print recipe during a printing run based on the amount of print platform force on the print platform measured by the print platform force sensor.

In some embodiments, a photoreactive 3D printing system comprises: a print platform, wherein the print platform is moveable; a resin tub, wherein the resin tub comprises a membrane; a tension apparatus; a volume of resin contained within the resin tub; an illumination system; a print platform force sensor; and a print recipe comprising information for layers in a 3D printed part to be built on the print platform, wherein the print recipe comprises one or more of build geometry, illumination energy, exposure time per layer, wait time between layers, print platform position, print platform movement, print platform velocity, print platform acceleration, resin tub position, resin tub force, resin chemical reactivity, and resin viscosity. The photoreactive 3D printing system can be configured to: project an image through the membrane at a polymer interface located within the volume of resin using the illumination system; move the print platform in a z-direction; apply a tensioning force using the tension apparatus to induce a membrane tension on the membrane; measure an amount of print platform force on the print platform using the print platform force sensor; and update the print platform movement in the print recipe during a printing run based on the amount of print platform force on the print platform measured by the print platform force sensor.

BRIEF DESCRIPTION OF THE DRAWINGS

FIG. 1F shows three simplified schematics in perspective views of a PRPS with two image projection systems, in accordance with some embodiments.

DEFINITIONS

Figure 1A:
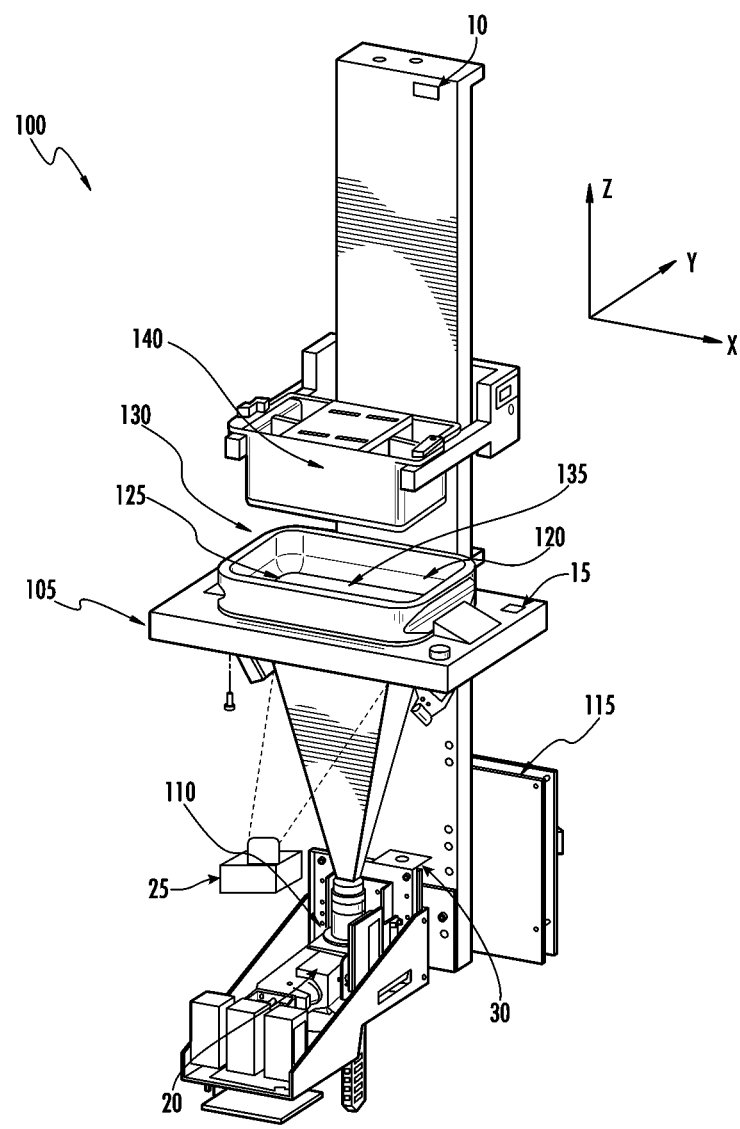
FIGS. 1A-1D are simplified schematics in perspective views of example photoreactive 3D printing systems (PRPSs), in accordance with some embodiments.
Figure 1B:
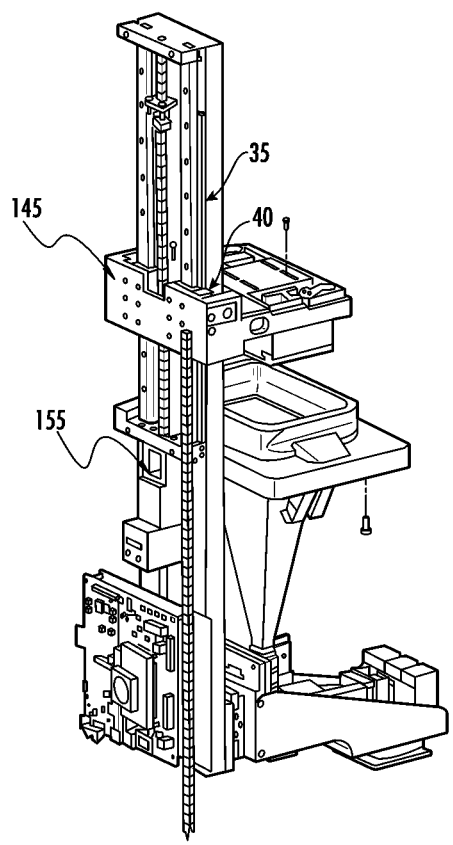

In the present disclosure, the following terms shall be used.

Resin: Generally refers to a monomer solution in an uncured state.

Resin Pool: Volume of resin contained within a Resin Tub, immediately available for a Print Job.

Resin Tub: Mechanical assembly incorporating a membrane and which holds the resin pool.

Print Platform (i.e., Print Tray): System attached to the elevator upon which the resin is cured and the physical part (i.e., printed object) is built.

Elevator system: System of parts that connect the Z-Stage to the Print Platform.

Z-Stage: Electro-mechanical system that provides motion to the Elevator System.

Polymer Interface: The physical boundary of the Resin Pool and the Image Display System's focal plane.

Membrane: Transparent media creating the Polymer Interface, generally oriented parallel to the XY plane.

Build Area: Area of the XY plane that can be physically addressed by the Image Display System.

Intra-Print: Context of events that can occur between the start and the finish of a single Print Job.

Inter-Print: Context of events that can happen both Intra-Print and outside the Intra-Print context.

Print Job (i.e., Print Run): Sequence of events initiated by the first, up to and including the last command of a 3D print.

Print Process Parameters (PPPs): Input variables that determine the system behavior during a Print Job.

Print Process: Overall print system behavior as governed by the Print Process Parameters.

Polymerization: Chemical reaction by which the liquid monomer transitions to a solid polymer.

Curing: Same as polymerization.

Layer Move: A move of the Print Platform in the Z axis between successive exposures of the Image Display System (where the orientation of the Z axis is similar to that shown in the example in FIG. 1A).

Recharge Move (i.e., Pump Move): A move of the Print Platform that is greater than a Layer Move to allow Resin to be replenished at the Polymer Interface.

Exposure Time: Temporal duration during which energy is transferred to the Polymer Interface.

Irradiance: Radiant power, per unit area, incident upon a surface, i.e., the Polymer Interface.

Pixel: Smallest subdivision of the build area XY plane where Irradiance can be directly manipulated (where the orientation of the XY plane is similar to that shown in the example in FIG. 1A).

Image Display System: Combination of electronics and optics that enables Pixel level manipulation of Irradiance, at the Polymer Interface, over the Build Area.

Illumination System: Combination of electronics and radiant emission sources that can be controlled by the Image Display System to adjust the Irradiance delivered to the Polymer Interface.

Closed Loop: Utilizing sensor feedback to automate performance adjustment of a "system" based on the optimal relationship between the "input" and the "output."

DETAILED DESCRIPTION

Disclosed herein are embodiments for closed loop feedback in photoreactive 3D printing systems (PRPSs). In some embodiments, PRPS are equipped with one or more sensors that monitor various parameters before, during, and/or after a print run. In some cases, the information from the sensors is used to alter the printing process during the print run, and thereby operate in a closed loop manner. Closed loop operation, as described by the systems and methods herein, can be beneficial for a variety of reasons, including improved print quality (e.g., printed object structural integrity, and object surface roughness), print run duration, and equipment longevity. Manufacturing efficiency and cost effectiveness of the system, as well as system maintenance and serviceability, can also be improved using the systems and methods described herein.

In some embodiments, the PRPSs described herein contain a plurality of sensors integrated into closed loop feedback systems, which enable improved (or optimal) printing efficiency over a broad range of operating variables without the need for manual intervention or highly specialized process profiling. This is in stark contrast to conventional systems, which typically operate in an open loop manner relying on fixed process settings that cater to a general purpose use case.

In some embodiments, two or more sensors are integrated in a closed loop feedback system in a PRPS, to provide information to adjust parameters of a print run in situ. The relationships between different input parameters (e.g., illumination energy, membrane tension, and print platform movement) and output parameters (e.g., local resin temperature, and force experienced by the print platform during movement) during printing are not recognized or utilized in conventional systems. The relationships between the different parameters can be complex, and based on insights that are non-intuitive. For example, the curing of the resin is an exothermic process, which causes the resin temperature to increase throughout a run, which can negatively impact the print quality throughout the print run. Compounding the complexity, in some cases the resin reactivity is also a function of temperature. For example, in some cases the resin can react more quickly at higher temperatures. Since printing different objects requires different amounts of illumination energy per layer and in different patterns, the temperature rise of the resin both globally and locally will be different for each printed object. Using the systems and methods described herein, complex interactions between multiple input and output parameters, like the ones described above, can be measured and accounted for during a print run, resulting in higher quality printed objects.

Systems and methods relating to PRPSs that include multiple image projection systems and/or image correction for various factors (e.g., resin reactivity, uniformity and alignment) are described more completely in U.S. patent application Ser. No. 16/370,337, the entirety of which is incorporated herein by reference. The systems and methods described in U.S. patent application Ser. No. 16/370,337 can be used in conjunction with the closed-loop feedback systems and methods described herein.

In some embodiments, the PRPSs described herein contain a 3D print engine, embedded system electronics, and a multitude of sensors (e.g., force gauges, position encoders, proximity/presence detection sensors, viscosity sensors, temperature/humidity sensors, accelerometers, light array sensors, etc.). All sensors can continuously and/or periodically acquire their respective data, which can be fed-back into the embedded system electronics. The embedded system electronics can process the data from the (one or more) sensors and compensate or adjust driving elements in the 3D print engine, in real time during printing, to optimize print quality and/or printing speed.

In some embodiments, a print recipe is used by the PRPS. The print recipe contains information for each layer in a 3D printed part to be built by the PRPS. The print recipe can contain instructions for the PRPS before, during and after a print run. For example, the print recipe can include parameters and instructions related to build geometry, illumination energy, exposure time per layer, wait time between layers, print platform position, print platform velocity, print platform acceleration, resin tub position, resin tub force, resin chemical reactivity, and resin viscosity. In conventional systems, the print recipe is pre-determined before a print run, and is static (i.e., it does not change during the print run). In the PRPSs and methods described herein, the print recipe can be updated before, during and/or after the print run. For example, the parameters and/or instructions contained within the print recipe can be updated before, during and/or after the print run based on input from one or more sensors in the PRPS. In some embodiments, the print recipe can also be updated before, during and/or after the printing of a given layer within the printed object.

Print quality can be affected by many different internal and external factors. Some non-limiting examples of factors that can affect print quality in PRPS include items such as resin reactivity and its temperature dependency, resin viscosity and its temperature dependency, irradiance level and its variation with multiple factors, print platform move speed, membrane tension, print platform move accuracy, oxygen depletion rates within the resin pool, printed part geometry, and printed object to membrane delamination forces. The overall part quality can be evaluated by printed object spatial accuracy, structural integrity (e.g., layer to layer adhesion, etc.), mechanical properties, surface finish, and other qualities of a printed object, all of which can be improved by implementation of the systems and methods described herein.

FIGS. 1A-1D illustrate an example of a PRPS 100, in accordance with some embodiments. The PRPS 100 shown in FIGS. 1A-1D contains a chassis 105, an image projection system (i.e. an "illumination system") 110, a display subsystem (i.e., an "image display system") 115, a resin pool 120, a polymer interface 125, a resin tub 130, a membrane 135, a print platform 140, an elevator system 145, elevator arms 150, a z-stage 155, a build area 160, and a membrane tension apparatus 165. The operation of the example PRPS 100 shown in FIGS. 1A-1D will now be described.

The chassis 105 is a frame to which some of the PRPS 100 components (e.g., the elevator system 145) are attached. In some embodiments, one or more portions of the chassis 105 is oriented vertically, which defines a vertical direction (i.e., a z-direction) along which some of the PRPS 100 components (e.g., the elevator system 145) move. The print platform 140 is connected to the elevator arms 150, which are movably connected to the elevator system 145. The elevator system 145 enables the print platform 140 to move in the z-direction (as shown in FIG. 1A) through the action of the z-stage 155. The print platform 140 can thereby be lowered into the resin pool 120 to support the printed part and lift it out of the resin pool 120 during printing.

The illumination system 110 projects a first image through the membrane 135 into the resin pool 120 that is confined within the resin tub 130. The build area 160 is the area where the resin is exposed (e.g., to ultraviolet light from the illumination system) and crosslinks to form a first solid polymer layer on the print platform 140. Some non-limiting examples of resin materials include acrylates, epoxies, methacrylates, urethanes, silicone, vinyls, combinations thereof, or other photoreactive resins that crosslink upon exposure to illumination. Different photoreactive polymers have different curing times. Additionally, different resin formulations (e.g., different concentrations of photoreactive polymer to solvent, or different types of solvents) have different curing times. In some embodiments, the resin has a relatively short curing time compared to photosensitive resins with average curing times. In some embodiments, the resin is photosensitive to wavelengths of illumination from about 200 nm to about 500 nm, or to wavelengths outside of that range (e.g., greater than 500 nm, or from 500 nm to 1000 nm). In some embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting an image. Some non-limiting examples of illumination sources are arrays of light emitting diodes (LEDs), liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

Figure 1C:
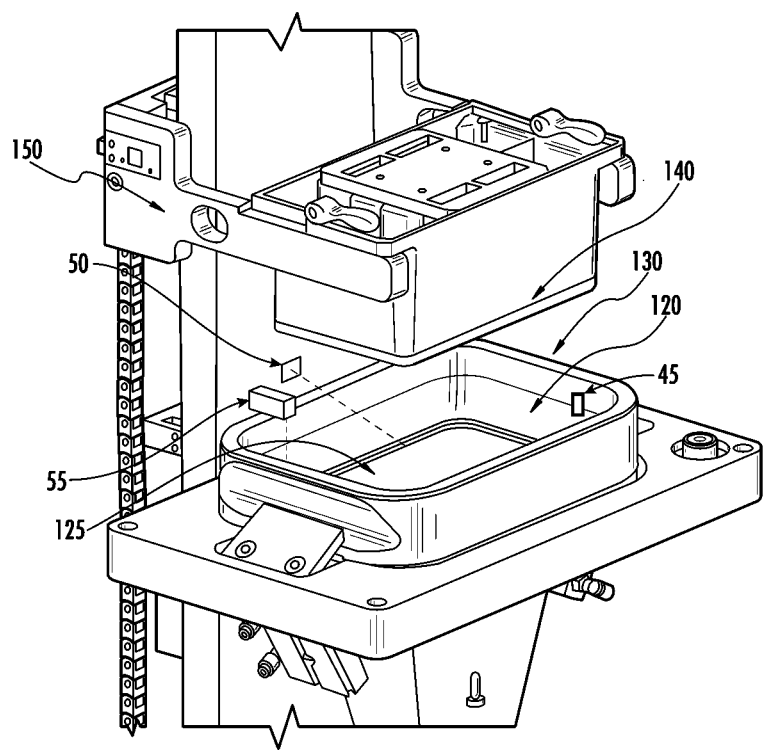
Figure 1D:
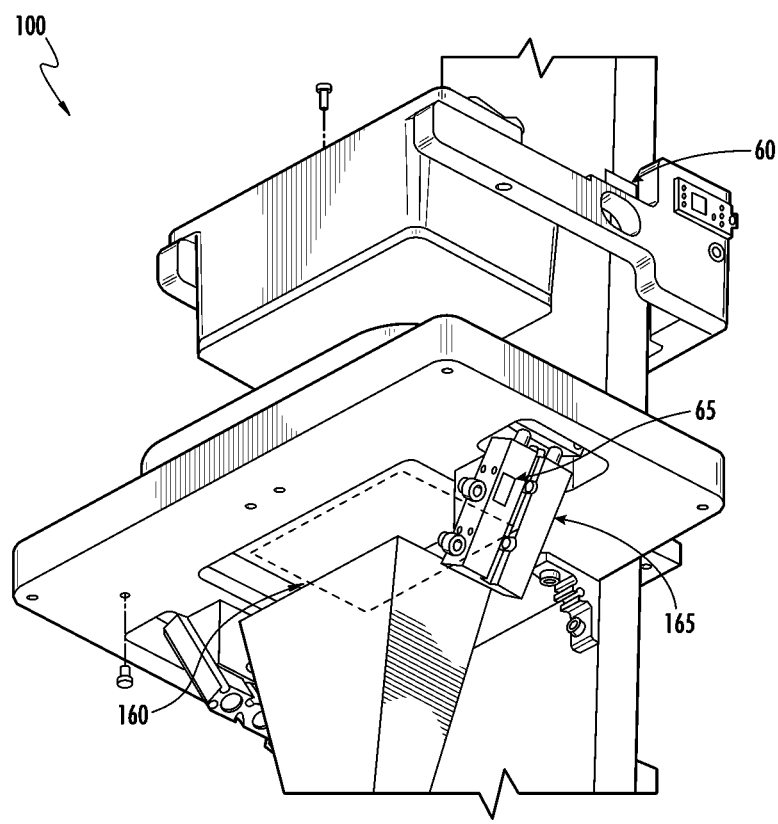
Figure 1E:
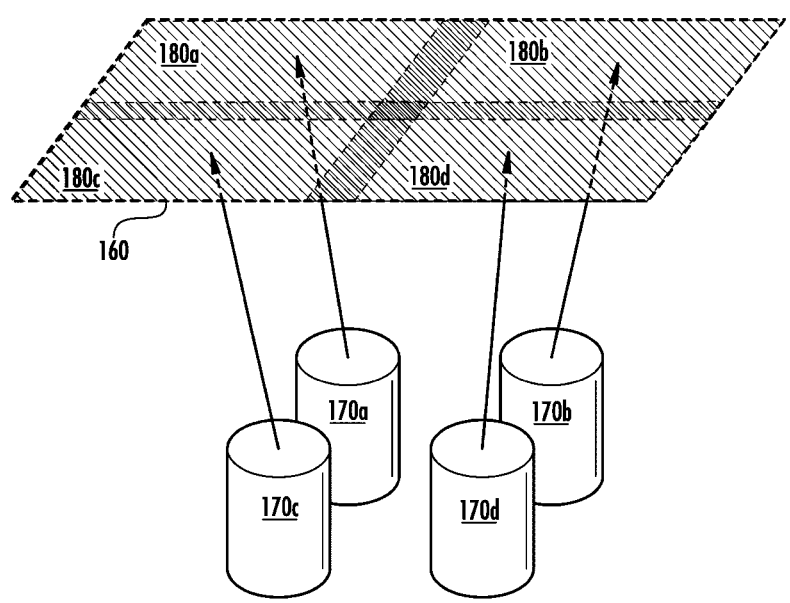
FIG. 1E is a simplified schematic in perspective view of a PRPS with four image projectors and a composite image with four sub-images, in accordance with some embodiments.

In some embodiments, the illumination systems (i.e., the image projection systems) of the PRPSs described herein (e.g., as shown in element 110 of the PRPS in FIGS. 1A-1D) contain a plurality of image projectors configured in an array. This can be advantageous to cover a large printing area with a high resolution of build element pixels without sacrificing print speed. FIG. 1E shows a simplified schematic example of a PRPS containing four image projectors 170a-d configured to project four sub-images 180a-d to form a single composite image over build area 160. FIG. 1E shows an example where the illumination systems are projection based systems, however, in other embodiments, the illumination systems can be projection or non-projection based systems including those that contain arrays of light emitting diodes, liquid crystal based projection systems, liquid crystal displays (LCDs), liquid crystal on silicon (LCOS) displays, mercury vapor lamp based projection systems, digital light processing (DLP) projectors, discrete lasers, and laser projection systems.

FIG. 1F shows three perspective schematics of a non-limiting example of a PRPS with two image projection systems 110a-b. The other components of the PRPS shown in FIG. 1F are similar to those shown in FIGS. 1A-1D, and some components of the PRPS are not shown in the system in FIG. 1F for clarity. The resin tub 130a and build area (not shown) within the resin tub are about twice as large as in the PRPS shown in FIGS. 1A-1D, which is enabled by using two image projection systems 110a-b rather than one.

Figure 1G:
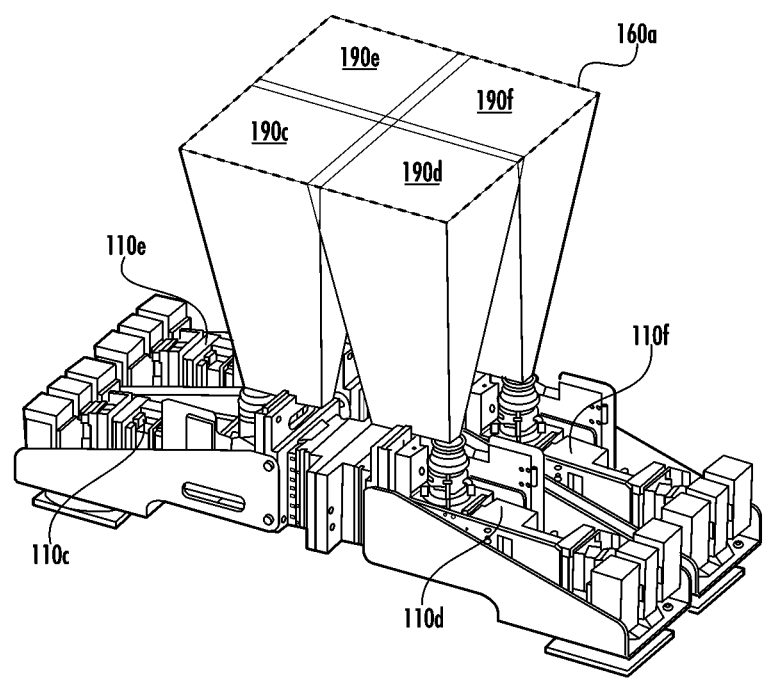
FIG. 1G is a simplified schematic of a portion of a PRPS in perspective view with four image projection systems, in accordance with some embodiments.

FIG. 1G shows a non-limiting example of a portion of a PRPS with four image projection systems 110c-f. In this example, the four image projection systems are arranged in a 2×2 array. In other embodiments, a PRPS has multiple image projection systems, which are arranged in an N×M array, where N is the number of image projection systems in one direction of the array and M is the number of image projection systems in another direction of the array, where N and/or M can be from 1 to 5, or 1 to 10, or 1 to 20, or 1 to 100, or 2, or 5, or 10, or 20, or 100. FIG. 1G shows four image projection systems 110c-f configured to project four sub-images 190c-f, respectively, to form a single composite image over build area 160a. FIG. 1G also shows that the sub-images overlap in this example.

In some embodiments, the build area is from 100×100 $mm^2$ to 1000×1000 $mm^2$, or from 100×100 $mm^2$ to 500×500 $mm^2$, or from 100×1000 $mm^2$ to 500×1000 $mm^2$, or square or rectangular ranges in between the previous ranges, or larger than 1000×1000 $mm^2$. In some embodiments, the sub-images projected from an array of image projectors each have an area that is from 50×50 $mm^2$ to 200×200 $mm^2$, or from 50×50 $mm^2$ to 150×150 $mm^2$, or from 50×100 $mm^2$ to 100×200 $mm^2$, or from 50×50 $mm^2$ to 150×150 $mm^2$, or 192 mm×102.4 mm, or 134.4 mm×71.68 mm. In some embodiments, the area covered by each sub-image is approximately rectangular, square, circular, oval, or other shape. In some embodiments, each image projector projects light with maximum or average power densities from 5 $mW/cm^2$ to 50 $mW/cm^2$, or from 10 $mW/cm^2$ to 50 $mW/cm^2$, or from 5 $mW/cm^2$ to 20 $mW/cm^2$. In some embodiments, the exposure time of each pixel or layer is from 0.05 s to 3000 s, or from 0.08 s to 1500 s, or from 0.08 s to 500 s, or from 0.05 s to 1500 s.

In other embodiments, the PRPSs described can contain one or more illumination systems that are capable of projecting images in more than one print area. Some examples of this are, illumination systems that are mounted on moving gantries (e.g., providing lateral movement, or pivoting movement), or that contain an optical system (e.g., using mirrors) that enable the projected image to be focused in different print areas. Such moving illumination systems can be advantageous to cover a large printing area with a high resolution of build element pixels while minimizing the number of illumination systems (i.e., minimizing equipment cost).

Figure 1H:
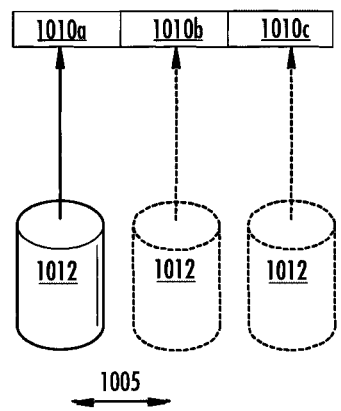
FIGS. 1H-1K are simplified schematics of moving light sources or moving optical systems to form composite images made up of moving sub-images, in accordance with some embodiments.

In some embodiments, the movement of the image projectors includes moving the light source of the image projector (e.g., such as an LED or lamp). In some embodiments, the light source moves by translation (e.g., along a plane that is roughly parallel to the plane of the build area). FIG. 1H shows a non-limiting example of a composite image made up of sub-images 1010a-c, where the light source 1012 moves by translation in the direction 1005. In some embodiments, the light source moves by translation and the direction of translation (e.g., 1005 in FIG. 1H) is approximately parallel to the plane of the build area. In such cases, each image can be calibrated for position, and other corrections, as described further herein.

Figure 1I:
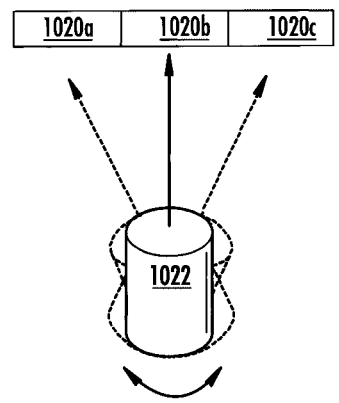

In some embodiments, the light source will move by tilting and/or rotating the light source around one or more axes of rotation. FIG. 1I shows a non-limiting example of a composite image made up of sub-images 1020a-c, where the light source 1022 moves by rotation in the direction 1006. In some embodiments, the direction of rotation (e.g., 1006 in FIG. 1I) has an axis of rotation that is approximately parallel to the plane of the build area. In cases where the image projectors rotate, the position and other corrections such as warp and skew, as described further herein, can be accounted for.

Figure 1J:
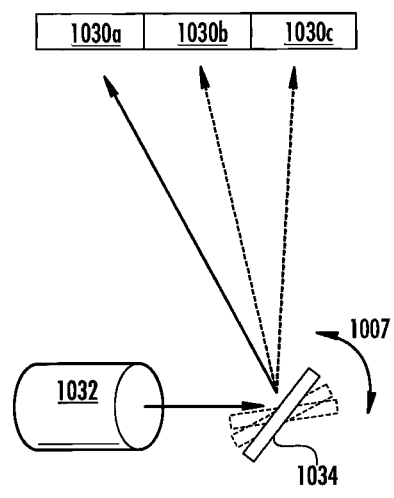
Figure 1K:
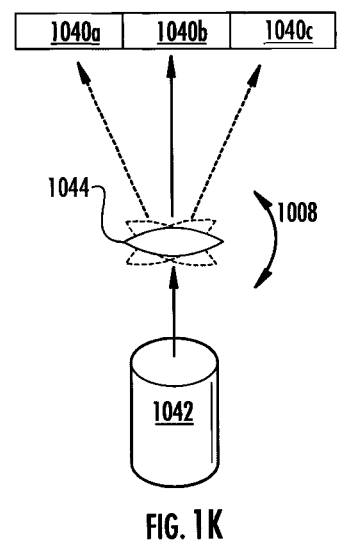

In some embodiments, the light source for the image projectors will be stationary and the projected sub-images will move through the use of moving optical systems (e.g., moving mirrors, or moving lenses). In some embodiments, the optical systems will move by translation (e.g., along a plane that is roughly parallel to the plane of the build area), or by tilting and/or rotating the optical systems around one or more axes of rotation. FIG. 1J shows a non-limiting example of a composite image made up of sub-images 1030*a-c*, where the light source 1032 is stationary, and a mirror 1034 moves by rotation in the direction 1007 to project the sub-images 1030*a-c*. Alternatively, FIG. 1K shows a non-limiting example of a composite image made up of sub-images 1040*a-c*, where the light source 1042 is stationary, and a lens 1044 moves by rotation in the direction 1008 to project the sub-images 1040*a-c*. In different cases of moving optical systems (e.g., those shown in FIGS. 1J and 1K), each projected image can be calibrated for position, warp and skew, and/or other corrections, as described further herein.

The non-limiting examples in FIGS. 1H-1K contain systems with one moving image projector, or one stationary image projector and one moving optical system (e.g., a mirror or lens). In other embodiments, the PRPSs described herein can contain more than one image projector and or optical system, and the image projectors and/or optical systems move to project a plurality of sub-images onto a build area. In these cases, the multiple image projectors and/or optical systems can all move by translation or rotation. In some embodiments, the PRPS contains sub-systems to enable each image projector and/or sub-image to move independently. In other embodiments, the PRPS contains sub-systems to enable all of the image-projectors and/or sub-images to move as a group. In some embodiments, the image projector(s) and/or optical system(s) can both translate and rotate to project sub-images at different locations within a build area.

Systems and methods relating to PRPSs including systems with multiple image projections systems, moving image projectors, and/or moving optical systems are described more completely in U.S. patent application Ser. No. 16/370,337, the entirety of which is incorporated herein by reference.

Figure 1L:
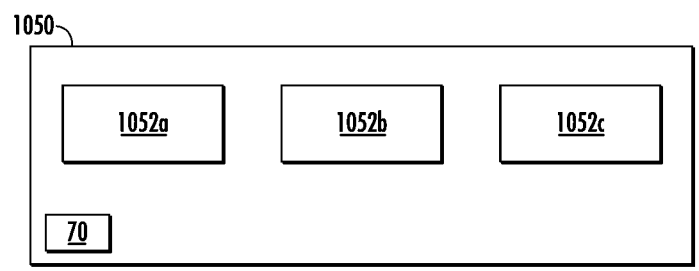
FIG. 1L is a simplified schematic of multiple PRPSs in a single enclosure, in accordance with some embodiments.

FIG. 1L shows a simplified schematic of multiple PRPSs 1052*a-c* contained within a single enclosure 1050, in accordance with some embodiments. Enclosure 1050 can maintain a controlled environment (e.g., air pressure, temperature, and/or humidity), isolate the PRPSs from external forces (e.g., ground motion), and house centralized systems shared by the multiple PRPSs. For example, enclosure 1050 can contain centralized control software capable of controlling multiple PRPSs 1052*a-c* in the enclosure 1050, a centralized robot that can interact with multiple PRPSs 1052*a-c* in the enclosure 1050, and other types of centralized systems and components, such as resin tanks for automated resin dispensing systems.

Figure 1M:
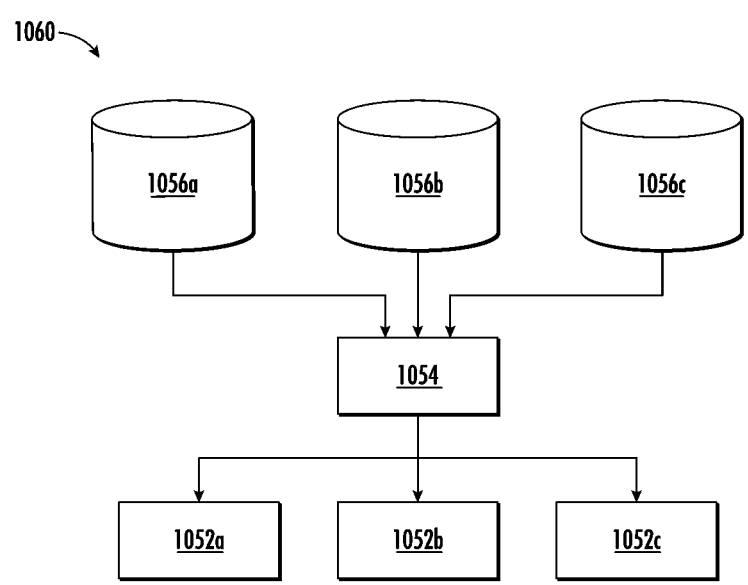
FIG. 1M is a simplified schematic of an automated resin dispensing system for one or more PRPSs, in accordance with some embodiments.

FIG. 1M is a simplified schematic of an automated resin dispensing system 1060 for PRPSs, in accordance with some embodiments. The example in FIG. 1M includes an automatic resin dispenser 1054, which can dispense resin from resin vats 1056*a-c* into the resin tubs of PRPSs 1052*a-c*. This example shows a single dispenser 1054 feeding resin from three resin vats 1056*a-c* to three PRPS 1052*a-c*, however, in different embodiments, from 1 to 10 dispensers can feed resin from 1 to 10 resin vats to 1 to 20 PRPSs. For example, one or more PRPSs can be fed using an automated resin dispensing system where each PRPS can have a single dedicated resin vat and dispenser, or each PRPS can have a dedicated dispenser feeding resin to the PRPS from one or more resin vats. It can be advantageous to have each PRPS have a dedicated dispenser and resin vat, for example, if different types of resins are used in the different PRPSs, then having dedicated resin dispensing systems can prevent resin cross-contamination. An enclosure (not shown) is used around the PRPSs and/or resin vats, in some embodiments.

The example system shown in FIGS. 1A-1D and the PRPSs shown in FIGS. 1E-1M, are non-limiting examples only, and variations on these designs can be made in accordance with some embodiments described herein. For example, other PRPSs can be inverted with respect to the system shown in FIGS. 1A-1G. In such "top down" systems, the illumination source is above the resin pool, the print area is at the upper surface of the resin pool, and the print platform moves down within the resin pool between each printed layer. The closed loop feedback systems and methods described herein are applicable to any PRPS configuration, including inverted systems. In some cases, the geometry of the sensor or feedback system can change to accommodate a different PRPS geometry, without changing the fundamental operation of the closed loop systems within the PRPS.

In some embodiments, additional systems (not shown in FIGS. 1A-1G) are included in the PRPSs described herein to move the resin within the resin pool. For example, the PRPSs described herein can include one or more resin circulation systems (e.g., a system with inlets, outlets and pumps to flow the resin in and out of the resin tub, or a physical mixer within the resin pool to mix the resin within the pool, or a wiper to move resin away from the membrane within the resin pool). Such resin circulation systems can be continuous or intermittent, can reduce the thermal gradients within the resin pool, and/or can provide fresh resin to the membrane (i.e., the print area), either before, during, and/or after a print run in response to one or more feedback parameters measured in the present systems and methods.

Figure 2A:
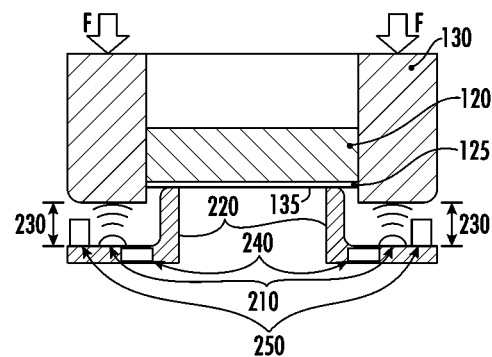
FIGS. 2A-2B are simplified schematics in vertical cross-sectional and perspective exploded views, respectively of examples of resin tubs, membranes, and membrane tension apparatuses for PRPSs, in accordance with some embodiments.
Figure 2B:
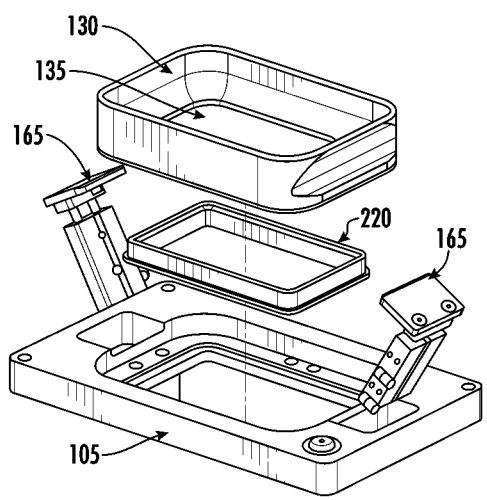

FIG. 2A shows an example of a resin tub 130 and a unique membrane tensioning system with resin tub vertical displacement sensors 210, which can be used in closed loop feedback systems in the present PRPSs, in accordance with some embodiments. In conventional systems, membrane tension can be fixed and set in the resin tub at the time the resin tub is assembled. However, this only allows for a predefined amount of tension that is static and non-adjustable. In the system shown in FIG. 2A, the membrane tension can be adjusted at any point during or between prints, where the adjustment can be made automatically in response to feedback information from one or more sensors 210. As depicted in FIGS. 2A and 2B, in some embodiments, the perimeter of the resin tub membrane 135 is attached to the resin tub 130, and the membrane 135 rests on a physical tension ring 220 such that a downward force (or load) "F" on the tub is applied to the membrane-tension ring contact interface thus causing the membrane to be placed in a state of increasing tension with increasing downward force F. The tension in the membrane can then be set to a desired level by applying a certain amount of down force based on a predetermined tension-force relationship. The desired level of membrane tension can be based on, for example, material properties of the membrane, print speed, system construction (e.g., if membrane is supported from below or not), resin viscosity, and/or print specifications (e.g., tolerance ranges of the printed part).

Position sensors 210, used to collect information about the vertical (i.e., z-axis) displacement 230 of the resin tub 130, provide feedback regarding the vertical displacement 230 of the resin tub 130 and indicate if the system is capable of supporting the required tension or if the membrane 135 has reached a critical, end of life, condition. For example, as described above, as the membrane 135 ages it will experience creep, and the resin tub vertical displacement 230 will change for a given amount of applied down force F. The vertical displacement 230 of the resin tub 130 is also dependent on the resin tub 130 down force F. This load F can be applied by the membrane tension apparatus either pneumatically or mechanically through many different mechanisms. In the non-limiting example shown in the PRPS in FIGS. 1A-1G and 2A-2B, a pneumatic cylinder apparatus 165 is employed to apply the force F to the resin tub 130. In some embodiments, the load F is monitored via sensors 210 in the down force mechanism, and the force feedback, the tub displacement feedback, and the previously determined tension-force relationship, are used to adjust the membrane tension at any point during a print job. In other embodiments, the membrane tension apparatus uses motors (e.g., stepper motors) and linear encoders to apply the down force F to the resin tub 130. In some embodiments, the membrane tension system is used to release (or reduce) tension from the membrane when not in active printing use (i.e., active printing mode) thus prolonging the useful life of this critical element.

FIG. 2A also shows a simplified cross-section schematic optional tension ring load cells 240 and membrane displacement load sensors 250. The tension ring load cells 240 are attached beneath tension ring 220, and provide off-line and real-time information regarding the force on the tension ring. This information can also be used to control the load F applied to the resin tub 130. The membrane displacement load sensors 250 are attached beneath the resin tub 130 and can provide off-line and real-time information regarding the force on the resin tub 130, which can also be used to control the load F applied to the resin tub 130. In some embodiments, sensors 210, 240 and 250 are all used in concert to control the membrane tension system, and also provide redundancy, which is useful to detect part failures (e.g., membrane creep, or pneumatic cylinder malfunction).

FIG. 2B shows a schematic in perspective view of an example of a membrane tension apparatus for a PRPS, in accordance with some embodiments. The example shown in FIG. 2B contains a resin tub 130, a membrane 135, a physical tension element (i.e., a tension ring) 220, a tension mechanism 165, and a print chassis 105. In the example apparatus shown in FIG. 2B, the membrane 135 is affixed to the resin tub 130 to form a container that is capable of holding the resin pool (not shown). In this example, the resin tub 130 with membrane 135 affixed is placed on the tension ring 220, and the tension mechanisms 165 are in contact with the resin tub 130. When the membrane 135 rests on the tension ring 220, the tension mechanism 165 (pneumatic cylinders in the example shown) can apply a down force F to the resin tub 130, which will stretch the membrane 135 over the tension ring 220. In this example, therefore, an increasing down force F applied to the resin tub 130 by the tension mechanisms 165 will increase the tension in the membrane 135. The build area (not shown), in this example, is smaller than the inner dimensions of the tension ring 220. In some embodiments, load cell(s) 240 shown in FIG. 2A can be mounted and appropriately positioned on print chassis 105 to measure localized downward force exerted by tension ring 220, resin tub 130, or by a combination thereof. Similarly, the displacement sensor(s) 250 shown in FIG. 2A can be mounted and appropriately positioned on print chassis 105 to measure displacement between resin tub 130 and its corresponding cavity in print chassis 105.

In some embodiments, a transparent plate (e.g., glass) (not shown) is affixed to the tension ring 220. In some embodiments, the transparent plate is flush with the top of the tension ring 220 (i.e., the part of the tension ring that makes contact with the membrane) and supports the membrane 135 from below. In other embodiments, a transparent plate is located above the top of the tension ring 220 and supports the membrane 135 from below. In still other embodiments, a transparent plate is located below the top of the tension ring 220 and supports the membrane 135 in the case of large deflections. In some embodiments, it is advantageous to have the transparent plate below the top of the tension ring 220. Not to be limited by theory, in some embodiments where the transparent plate is located below the top of the tension ring 220, more air (or oxygen) will permeate the membrane 135 (compared to embodiments where the glass is at or above the top of the tension ring and in direct contact with the membrane 135) and be absorbed by the resin adjacent to the membrane 135. The absorbed air (or oxygen) will reduce the curing rate of the resin adjacent to the membrane 135 and reduce the probability of the resin adhering to the membrane 135.

In different embodiments, sensors of the present PRPSs can include one or more of a z-stage position sensor, a z-stage velocity sensor, a z-stage acceleration sensor, a resin tub vertical displacement sensor, an elevator arm load sensor, an accelerometer, a resin bulk temperature sensor, a thermal imaging system, and illumination system sensors.

Referring again to FIG. 1A, non-limiting examples of sensors integrated into an example PRPS are shown. An accelerometer 10 is shown attached to an upper portion of the chassis 105 that can measure local acceleration of the PRPS in various directions (e.g., due to ground movement, or other external force). A gyroscope (or accelerometer, or level sensor) 15 is also shown attached to the chassis 105 that can measure global acceleration (in various directions) or tilt of the PRPS. The PRPS in FIG. 1A also contains a radiant power sensor 20, which is embedded within the illumination path of optics in the image projection system 110, capable of measuring the intensity of the output from an illumination source within the image projection system 110.

Continuing with FIG. 1A, the PRPS can contain several image sensors to measure different properties of the membrane 135, the build area 160, or regions adjacent to the membrane 135 and/or build area 160. For example, the PRPS in FIG. 1A contains a thermal image sensor 25, which is positioned to image a region near the build area 160, that can measure the temperature distribution of the resin in the proximity of the build area 160 within the resin tub 130. The PRPS in FIG. 1A also contains a second image sensor (or capture device) 30, which is also positioned to image a region near the build area 160, that can measure any wavelengths of electromagnetic radiation.

The image sensors 25 and/or 30 in the present PRPSs can acquire high resolution images (e.g., with one or more pixels of detected resolution per actual pixel area in the build area), or low resolution images. In some cases, the image sensors 25 and/or 30 acquire low resolution images, which are subsequently up-sampled. For example, low resolution images can be up-sampled using Single Image Super Resolution (e.g., with artificial intelligence, or deep learning) up-sampling. Up-sampling low resolution images can help detect issues (or anomalies) with images displayed on the build area, and send information back to the PRPS to adjust the print recipe content in real-time. Acquiring low resolution images is advantageous because it reduces the cost of the image sensor components (e.g., an inexpensive web-cam low resolution camera can be used instead of a more expensive high resolution (e.g., 1080×1920) image sensor).

The second image sensor(s) 30 can be used to provide spectral or hyperspectral information (i.e., at single wavelengths or multiple wavelengths to provide measured spectra), for example, measurements of the projected image, the resin properties, temperature distributions, and/or the presence of foreign contaminants. The second image sensor 30 can detect wavelengths in any range, for example, IR (e.g., using a thermal imaging camera), UV (e.g., in the wavelength of the image projection system 110), or visible (e.g., using an RGB camera).

For example, second image sensor 30 can be an image sensor capable of detecting the wavelength output from the image projection system 110 (e.g., a UV wavelength of light used to expose the resin), and can be used to provide off-line or real-time feedback regarding the accuracy of the projected image in the build area 160 (or in a region adjacent to the build area 160). In some cases, a low-cost camera (e.g., a webcam) is capable of detecting the wavelength output from the image projection system 110, and can be used to capture images of the membrane or build area from below (e.g., by pointing the camera at the bottom-side of the resin tub) to check if the projected layer images are being projected as expected. The captured images can be displayed in visible light colors for an operator to monitor during a print job. In some cases, computer vision can be employed to analyze the captured images and detect if there is a problem with the projection system or image display subsystem (e.g. problems with the hardware, corrupted file data content, etc.) early before wasting resin and time on an erroneous part. In some embodiments, the information from the second image sensors 30 can be processed (e.g., using computer vision) and fed back to the PRPS to adjust the print recipe during a print run (e.g., by adjusting properties of the projected image based on measurements from sensor 30 until the measurements match expected values).

In some cases, second image sensor 30 can detect light in the IR wavelengths (or UV or visible wavelengths) to determine if there is dust or debris in the optical path between the image projector and the membrane. Such a sensor could be used in combination with a dedicated projector to detect dust or debris in the optical path between the image projector and the membrane. An image sensor or sensors 30 capable of resolving a plurality of energy wavelengths, for example from UV to visible, or UV to IR, or visible to IR, can be employed to detect foreign contamination between the print glass and the membrane, or contamination in the resin tub that has settled on the membrane. For example, an expected displayed image can be compared against an image captured from the capture device(s) 30 to detect the presence of debris. In some cases, multiple image spectra may be employed to detect different types of contamination, such as solid particles and/or cured resin contaminants from previous builds.

In another example, the second image sensor 30 can be an image sensor capable of detecting a spectrum (e.g., 100 nm to 20 microns) that provides information regarding the presence of cured and uncured resin (e.g., by detecting the presence of cross-links), and can be used to provide real-time feedback regarding the amount and distribution of cured versus uncured resin in the build area 160 (or in a region adjacent to the build area 160). Such a sensor 30 could also be used to determine if cured resin is near the membrane, for example, due to cured resin breaking off of the part being printed. In another example, the second image sensor 30 can be an image sensor capable of detecting a spectrum (e.g., 100 nm to 20 microns) that provides information regarding other properties of the resin, such as if the resin has degraded over time, the presence of water, and/or the presence of other foreign contaminants in the resin.

Referring again to FIG. 1B, additional non-limiting examples of sensors integrated into an example PRPS are shown. A linear encoder strip 35 is placed on a vertical (i.e., z-direction, as shown in FIG. 1A) portion of the chassis 105, and a linear encoder sensor 40 is attached to the elevator system 145. The linear encoder sensor 40 is coupled to the linear encoder strip 35, such that when the elevator system 145 moves in the vertical direction the linear encoder sensor 40 can provide off-line or real-time information regarding the elevator system 145 position relative to the linear encoder strip 35. Such real-time information can be used, for example, to provide feedback regarding the actual layer thicknesses being printed during a print run (e.g., accurate to a few microns). If the elevator system 145 has moved slightly too far, or not enough, then the actual position information can be used to adjust the print recipe and account for the error, for example, by applying more or less energy to the layer during exposure depending on the actual layer thickness.

Referring again to FIG. 1C, additional non-limiting examples of sensors integrated into an example PRPS are shown. A thermocouple (TC) 45 is shown in physical contact with the resin 120 in the resin tub 130, to measure the temperature of the resin. In other embodiments, a TC can be located on the outside of the resin tub, and can be calibrated to provide information regarding the temperature of the resin 120 in the resin tub 130. An IR temperature sensor 50 is also shown as another example of a sensor that can measure the temperature of the resin 120 in the resin tub 130. In some embodiments, the IR temperature sensor 50 is capable of capturing an image to provide spatial information of the temperature of the resin 120 within the resin tub 130. In other embodiments, the IR temperature sensor 50 can only take a single point (or multiple points) of measurement, but not a whole image. The PRPS in FIG. 1C is also equipped with a resin level sensor 55, which can measure the amount (or depth) of resin 120 in the resin tub 130. For example, such a resin level sensor 55 can be useful to measure the consumption rate of the resin 120, and/or if any resin has broken off of a part being printed (which would affect the resin level as the printed part is moved in and out of the resin 120).

Referring again to FIG. 1D, additional non-limiting examples of sensors integrated into an example PRPS are shown. A strain gauge 60 is shown attached to one of the elevator arms 150. In some embodiments, a strain gauge 60 is placed on each of the elevator arms 150. The strain gauge 60 can be used to measure the strain experienced by the elevator arms to provide information regarding the force and/or position of the elevator arms 150. The PRPS in FIG. 1D is also equipped with a pressure sensor 65 embedded in one or more of the pneumatic cylinders of the membrane tension apparatus 165. The pressure sensor 65 can provide off-line and real-time information about the pressure the membrane tension apparatus 165 is applying to the membrane 135.

Referring again to FIG. 1L, one or more environmental sensors 70 can be positioned near one or more PRPSs to acquire environmental data such as air pressure, temperature, humidity, particle counts, smells, chemicals in the environment, or other environmental information, and this information can be used to adjust the print recipe during a print run or between print runs, or can be used to abort print runs. In the FIG. 1L the environmental sensor(s) 70 are placed within an enclosure 1050, however, in other embodiments, environmental sensor(s) 70 can be placed in a factory or other space near one or more PRPSs.

Table 1 shows some non-limiting examples of information that can be obtained from sensors ("Sensor Information") that can be incorporated into the PRPS and how the information from the different sensors can be used to adjust different process parameters in closed loop feedback systems and methods ("Process Parameter/Action"), in accordance with different embodiments.

the resin settling over time. The PRPSs and methods described herein can also provide information about resin aging and vertical viscosity gradients. For example, the print platform can be moved through the resin pool in the vertical direction, and the position, velocity and forces experienced by the print platform can be measured using the appropriate sensors (e.g., position, velocity and acceleration sensors attached to the z-stage as a z-stage position sensor, a z-stage velocity sensor, and a z-stage acceleration sensor, and an elevator arm load sensor), which will give some information regarding vertical viscosity gradients within the resin pool.

In another example, thermal image feedback can be obtained from the interface between the membrane and the

TABLE 1

Examples of information that can be obtained from sensors in a PRPS.

| Sensor Information | Process Parameter/Action |
| --- | --- |
| force or load from print tray (i.e., print platform) and/or elevator arms | adjust print speed (also can be influenced by: resin viscosity, resin temperature, print interface oxygen depletion rate, print interface cross-sectional area, current print speed, change in irradiance from UV imaging source) |
| thermal image feedback from interface between membrane and resin | adjust energy density being emitted |
| bulk thermal feedback from resin pool | adjust pumping of resin (e.g., lower the pumped resin temperature), print speed, cooling to the resin pool, or resin circulation speed |
| absolute position, velocity or acceleration of the print tray | adjust absolute position, velocity or acceleration of the print tray, or adjust illumination energy to account for actual layer thickness |
| radiant power from the illumination system | adjust input power or exposure time |
| gyroscope, accelerometer, or level indicator of the printer chassis | job abortion |
| membrane tension and resin tub position as indicators of membrane creep | replace resin tub or change tub placement |
| membrane tension | adjust pneumatic pressure in membrane tension system, or job abortion |
| resin level | abort job (e.g., if part breaks during printing) |

In an example, force (or load) feedback can be obtained from a load sensor (e.g., attached to the elevator load arm in the form of an elevator arm load sensor) to measure the amount of load experienced by the print platform system in PRPSs. The information from this sensor can then be used to change parameters such as the print speed. Some non-limiting examples of factors that can influence the load experienced by the print platform are the resin viscosity, the resin temperature, the print interface oxygen depletion rate, the print interface cross-sectional area, the print speed, and changes in irradiance from the imaging source (e.g., an ultraviolet illumination system). Additionally, the print platform load feedback can be used to determine if the finished part is within acceptable limits from a mass perspective indicating that the completed printed part(s) is/are present on the build tray and is absent of any foreign or excess material. In some embodiments, during a print job, the load feedback could also determine if there was an adhesion problem and if the part has delaminated from the print platform. In some cases, the load feedback can also be used to understand excess material adhesion to the part in the form of wetted surface area or filled in trapped voids inside the part geometry. This can provide feedback on how to optimize process flow to reclaim waste resin.

In some embodiments, the resin can contain a vertical viscosity gradient, such as due to the pigments and fillers in resin (e.g., within the print area) using a thermal imaging sensor to measure the local temperatures within the resin pool in PRPSs. The polymerization reaction tends to be exothermic and excessive heat generation can extend the polymerization reaction past the physical boundaries desired for the geometry being printed. Having a thermal image map from the print area, in real time, enables the image display system to make adjustments to the energy density being emitted to compensate for excessive energy build up in specific spatial locations within a print layer. In some embodiments, this compensation for local temperature anomalies (e.g., hot spots) can increase printing speed by reducing the need for excessive pump moves (i.e., recharge moves), which are slow, but help to maintain a uniform temperature at the print interface. It also prevents unwanted material curing and thus improves the overall dimensional accuracy of printed parts.

Figure 3:
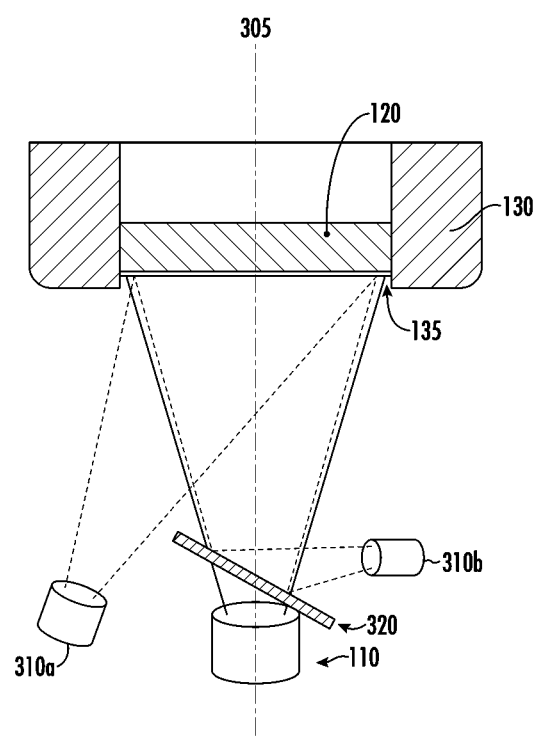
FIG. 3 is a simplified schematic in vertical cross-sectional view of examples of thermal imaging systems for PRPSs, in accordance with some embodiments.

FIG. 3 shows some non-limiting examples of thermal imaging systems that can be employed in PRPSs to detect local and/or bulk temperatures. In some embodiments, a thermal imaging system contains a thermal imaging camera 310*a-b*, which is focused on the plane within the resin pool 120 adjacent to the membrane 135 (i.e., within or adjacent to the print area). A first embodiment in FIG. 3 shows the situation where the thermal imaging camera 310*a* is offset from the axis 305 of the illumination system 110. In such a situation, image correction can be employed to correct for the different axes between the thermal imaging camera 310*a* and the illumination system 110 and correlate a position measured in the thermal image to a pixel within the print area. A second embodiment in FIG. 3 shows a situation where a "hot mirror" 320 (i.e., a mirror that reflects infrared light, and is transmissive to the wavelengths used by the illumination system (e.g., ultraviolet light)) is uniquely used to align the optical path of the thermal images captured by the thermal imaging camera 310*b* coaxially with the optical path of the images projected by illumination system 110. In the embodiment of FIG. 3, the hot mirror is aligned with the optical axis 305 of the illumination system 110 (i.e., aligned with the optical path from the illumination system to the polymer interface), where the hot mirror 320 is angled such that the thermal imaging camera 310*b* captures images reflected by the hot mirror 320. The coaxial alignment enabled by the hot mirror 320 eliminates the need for image corrections required in other configurations, and can in some embodiments, provide better thermal image resolution and more accurate correlation between the thermal image and the pixels being exposed within the print area.

In another example, bulk thermal feedback can be obtained from the resin pool in PRPSs. The bulk thermal measurement can be obtained from any position within the resin pool, or adjacent to the resin pool. In some embodiments, more than one bulk measurement is used to obtain a more accurate measurement of the bulk temperature within the resin pool, and optionally to obtain some indication of bulk gradients within the resin pool. In this context bulk gradients are distinct from local temperature fluctuations on the pixel length scale (e.g., which can be measured by a thermal imaging system), and bulk gradients refer to larger scale temperature fluctuations. In some embodiments, information from more than one bulk thermal sensor within the resin pool and information from a thermal imaging system are used in combination to construct a more accurate temperature distribution within the resin pool. In some embodiments, during a print job, this information indicates if there is excessive heat buildup on a macro scale. The temperature of the resin can affect the polymerization reaction rates, and if left unaccounted for can cause part accuracy issues and/or material property issues. In more severe cases, unaccounted for bulk resin temperatures can lead to warping of a printed object. Monitoring this metric enables the system to apply countermeasures such as changing the illumination energy, pumping in new resin at a lower temperature, increasing the print speed, decreasing the print speed (which is not optimal), or applying solid state cooling directly to the resin or resin tub. In some embodiments, the system also employs a closed loop resin dispensing system where the resin is continuously circulated and maintained at an optimal temperature.

In another example, absolute position feedback of the print tray (e.g., from a z-stage position sensor) can be obtained. In some embodiments, the position of the print platform enables several process monitoring and quality enhancements. For example, absolute position feedback enables real-time part geometry checking and monitoring. For example, real-time absolute position feedback of the print platform can be used to provide information regarding the actual layer thicknesses being printed during a print run, which can be fed back to adjust the print recipe and account for the error, for example, by applying more or less energy to the layer during exposure (e.g., by adjusting the exposure time) depending on the actual layer thickness. In another example, absolute position feedback can determine if the system has undergone a move error or accumulated error that would result in unacceptable part quality. This condition detection, if un-correctable, could then enable the system to abort the print job thus eliminating additional raw material waste and machine time overhead. This is preferable to completing the errant job, which may take hours to complete, and discovering the failed part in subsequent process steps. In some embodiments, absolute velocity and acceleration of the print tray is obtained (e.g., from a z-stage velocity sensor, and/or a z-stage acceleration sensor), and the obtained information is employed to determine if the print process is operating within required process control limits. In some embodiments, this information is used in a closed loop feedback system to control printing parameters such as subsequent layer print tray speeds, and illumination energies. The print platform position, velocity and/or acceleration can also be used in conjunction with the force feedback from the print platform to ensure that process adjustments being made intra-print are being faithfully executed.

In another example, the illumination system can be outfitted with one or more illumination system sensors and used for closed loop feedback within PRPSs. The print process is highly dependent on accurately irradiating a pre-determined spatial pattern with a specific amount of energy, where the energy transfer is governed by the energy flux and the time of exposure. Since energy emitters, such as LEDs, have output characteristics that are dependent on multiple factors (e.g., input energy, temperature and device age), in some embodiments, the ability to monitor the illumination system for both input and output characteristics is essential. An example of an illumination system sensor is a radiant power sensor that provides feedback within the imaging system during the print run, and enables monitoring and adjusting of the ultimate energy dose for each layer curing event. Another example of an illumination system sensor is a sensor to monitor the thermal properties of the illumination system, such as the LED junction temperature, which can also provide feedback on the overall efficiency of the input power to output radiant energy conversion. Adjustments can then be made based on feedback from one or more illumination system sensors using a highly responsive control system to maintain optimal performance of the illumination system and improve the printed object quality. For example, the cooling process of the illumination system can be adjusted based on thermal measurements of the illumination system, while the control system simultaneously monitors output power and adjusts either input power to the illumination system or exposure time (in the print recipe) to ensure accuracy of the total energy transfer to the pixels of the layer being printed. Additionally, in some embodiments, the input power to output power characteristic of the illumination system can be monitored (e.g., using an illumination system sensor capable of measuring the output power of the illumination system) over the life of the system to determine when it is no longer within acceptable operating limits. This allows preventative system maintenance and component replacement, further reducing machine down time and the possibility of failed print jobs.

In another example, movement sensors can be used to detect kinetic events in PRPSs that could adversely affect the print quality. Some non-limiting examples of movement sensors are a gyroscope (e.g., a nine degree of freedom gyroscope, or gyro), an accelerometer, and/or a level indicator. In some embodiments, movement sensors are used to detect events that affect the whole system. For example, movement sensors can detect if the system is bumped, or if the support (e.g., table) upon which the system is sitting has experienced any movement (e.g., from a passing heavy vehicle). The movement sensors can be attached to any part of the system, such as the chassis. In some embodiments, thresholds can be set that would enable a job to abort if a predetermined kinetic limit (e.g., velocity, acceleration, or displacement) is exceeded. For example, the movement sensor can be an accelerometer that monitors physical movement of the PRPS during a print run, and sends a signal to abort the print run if an acceleration is detected above a predetermined threshold. As previously stated, early abortion of a print job that is known to be outside acceptable quality limits saves raw material and reduces wasted machine time. In some embodiments, different thresholds can be applied to different types of printed objects. For example, some printed objects (e.g., parts for aerospace or biomedical applications) are sensitive and/or have tight tolerances requiring low kinetic event thresholds, while other printed objects (e.g., children's toys) have wider manufacturing tolerances such that more extreme kinetic events are acceptable without requiring job abortion. In some embodiments, the level indicator information is used in a closed loop system, engaged with a series of adjustable position actuators, to adjust the printer orientation such that the PRPS coordinate axis is properly maintained relative to the fluid level in the resin tub.

In another example, PRPSs can include resin level sensors capable of measuring the level of the resin in the resin tub. Some non-limiting examples of sensors (or sensor systems) capable of measuring either the fluid/liquid level of the resin are optical sensors (e.g., using LEDs, lasers or imaging systems), ultrasonic sensors, float-type sensors, and capacitive sensors. These resin level sensors can monitor the resin fluid level in the resin tub, which is advantageous for several reasons. Some non-limiting examples of use cases for resin level monitors include the following. Resin level sensors can be used to determine the amount of resin consumption (e.g., by measuring the resin level before and after a part is printed). Resin level sensors can also be used to determine whether a part has fallen off the build platform (e.g., if resin level suddenly spikes up, then spikes down, or a combination thereof, then such measurements can be used to alert the system to quickly abort). Resin level sensors can also be used to determine whether the part printed correctly or is being printed correctly (e.g., by monitoring the rate of change of the resin level over time, or the rate of resin consumption in real time). Resin level sensors can also be used to determine whether a leak or burst in the membrane occurred (e.g., if the resin level drops at a higher rate than would be expected from normal printing). Resin level sensors can also be used to determine whether resin in the resin tub is inadvertently cured by ambient lighting (e.g., if the resin level does not decrease during a print job, then the fluid level measurements can indicate that the resin in the tub was accidentally cured into a "slab" within the resin tub).

In another example, feedback is collected from the z-stage drive system, and used in closed loop feedback systems in PRPSs. For example, the z-stage drive system can include sensors to measure the position, velocity and/or acceleration of the z-stage (and provide information about the position and motion of the print platform, since it is connected to the z-stage). In some embodiments, the detected information from the z-stage drive system (e.g., position, velocity and/or acceleration) enables reliability monitoring and error condition checking.

In another example, resin tub vertical displacement information can be obtained and used in closed loop feedback systems in PRPSs. For example, the resin tub vertical displacement can be an indicator of membrane creep. In some embodiments, excessive membrane stretch indicates resin tub and/or membrane end-of-life. In other cases, the resin tub vertical displacement information provides feedback on the proper placement and installation of the resin tub, for example, as indicated by uneven displacement around the perimeter of the tub.

In another example, as described above, pneumatic pressure is used to maintain proper tensioning of the membrane used for the resin print interface. Changes in membrane tension can adversely affect the print quality. Detecting excessive fluctuations in membrane tension (e.g., using the resin tub vertical displacement sensors and/or measurements of the down force on the resin tub) can enable early job abortion, thus preventing resin waste and unproductive manufacturing time. In some embodiments, regulated pressure adjustment can be used to enable active changes to the membrane tension between print jobs and even during print jobs when different print moves are optimized against specific membrane tensions.

In some embodiments, the data collected from the sensors and control systems becomes part of a permanent quality record for the parts produced during the print job.

In some embodiments, information from more than one sensor is used in closed loop feedback systems in PRPSs. Some examples of closed loop systems in PRPSs employing more than one sensor are described above. Some additional examples of closed loop systems in PRPSs employing more than one sensor will now be described.

Figure 4:
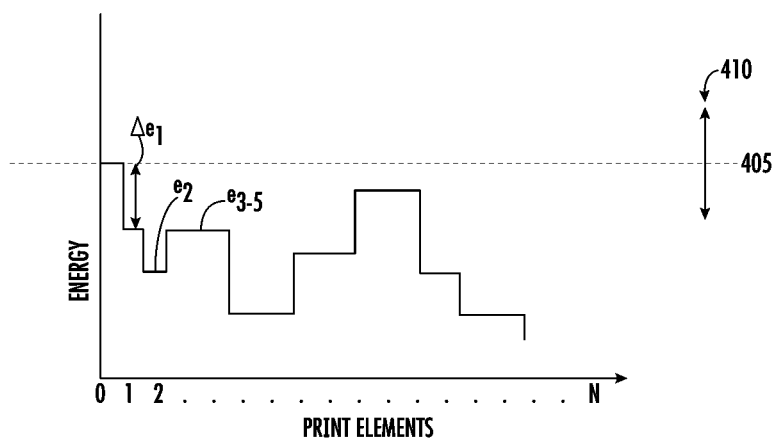
FIG. 4 is a simplified graph showing an example of illumination energy for a plurality of pixels, in accordance with some embodiments.

In an example, thermal feedback from more than one sensor can be obtained and used to enable energy exposure adjustment in bulk and for each spatially addressable element of the build area in PRPSs. Temperatures of the resin bath (e.g., taken at one or more points within the resin pool) can be monitored to detect changes in the bulk resin temperature. These changes can be used to make adjustments to the overall (or maximum, or average) energy level of each print layer exposure to compensate for changes in the bulk resin reactivity as a function of resin temperature. FIG. 4 shows an example energy graph with illumination energy on the y-axis and pixels (i.e., "print elements") along the x-axis. The operating global energy level is shown as the dotted line 405, which is a reference point for all of the illumination energies in an image, wherein the illumination energy of each pixel is determined as an offset from the operating global energy level 405. In some embodiments, the operating global energy level 405 can be adjusted as indicated by arrow 410 based on the bulk resin temperature. Additionally, thermal image feedback of local temperatures in the build area can be used in conjunction with the bulk temperature feedback to fine-tune the amount of energy being delivered to each spatially addressable element of the build area. FIG. 4 shows an example where different pixels (e.g., 0, 1, 2, . . . ) are adjusted with different corrections on a per pixel basis (e.g., "$\Delta e_1$", "$\Delta e_2$", "$\Delta e_{3-5}$", etc.) based on the information from the thermal imaging system. FIG. 4 shows an example where the amount of energy delivered to pixel 1 has been decreased by an amount $\Delta e_1$ compared to the original (or unadjusted) pixel 1 energy level which was equal to that of pixel 0. The energy delivered to pixel 2 has been changed to new level $e_2$ (the pixel 2 energy level before correction is not shown in the figure), and the energy delivered to pixels 3-5 has been changed to a new level $e_{3-5}$ (the pixel 3-5 energy levels before correction are not shown in the figure).

In another example, in a PRPS with an exposure resolution of 1920 by 1080 pixels there are 2,073,600 unique spatially addressable elements in the build area. Exposing specific regions of the build area to energy causes "local" thermal fluctuations (i.e., on the pixel length scale) within the resin pool. Since the reactivity of the resin is typically dependent on temperature, these local temperature fluctuations caused by the printing process of a layer directly influence the exposure of a subsequent layer, and the thermal interactions between adjacent layers during printing can ultimately affect the end part quality. Various courses of action can be taken to mitigate this effect such as waiting for a return to a spatially uniform thermal gradient. However, this approach would slow the print process potentially rendering it not economically viable. In some embodiments, the PRPSs described herein overcome these problems by combining the feedback of the bulk resin temperature and the thermal image system in a closed loop system to continuously ensure that the energy level is optimized, both globally and locally, for print speed and part quality. For example, as hot spots develop in the build area the exposure energy levels for subsequent printed layers can be reduced in those "hot" regions to maintain part build quality without introducing delays in the print process. In this manner, closed loop feedback from both bulk and local temperature monitoring systems can be used to maintain maximum print speed without sacrificing build quality.

In some embodiments, the relationship between energy delivered to the resin and the cure depth (i.e., the degree to which the photopolymer cures) are related by a function, and that function can have any relationship (e.g., linear, logarithmic, piece-wise continuous without an analytical expression, discrete, etc.). This relationship can be used in a closed loop feedback for a PRPS, for example, to adjust the energy delivered to a given pixel based on a desired cure depth of the pixel and a measurement of the resin temperature in the vicinity of the pixel.

In some embodiments, the illumination source (e.g., lamp, LED array, laser, etc.) within the illumination system will age over time, causing the amount of energy projected onto the print area to decrease over time. In some embodiments, the PRPSs and methods described herein can account for the illumination system aging. In some cases, the light output from the illumination system can be directly measured (e.g., using a photosensor) over the lifetime of the illumination source. In another example, the bulk resin temperature and thermal imaging system can detect changes in resin temperature for a given amount of delivered illumination energy, and if the temperature rise is less than expected (e.g., due to an aging illumination source), then the operating global energy level 405 can be changed to account for the discrepancy. In some embodiments, a PRPS can have a new light source within the illumination system, and the operating global energy level 405 can be set at a lower level (e.g., 80%). Then, as the illumination source within the illumination system ages, the operating global energy level 405 can be increased (e.g., up to 90%, or 95%, or 100%) to keep the print quality consistent from run to run over the useful lifetime of the illumination source.

In another example, information from multiple sensors can be obtained, and used to determine the resin viscosity and predict maximum acceptable accelerations and velocities of vertical elevator moves in PRPSs. In the following example, information from two or more of the following sensors can be used together: z-stage position, movement direction, velocity and acceleration, resin bulk temperature, resin tub down force, resin tub vertical displacement, and elevator arm load sensor. In this example, the information from the resin bulk temperature sensor, along with the information from one or more of the additional sensors listed above, will enable the system to determine the resin viscosity and predict maximum acceptable accelerations and velocities of vertical elevator moves. For example, the viscosity of the resin will impact the loads experienced by the print platform as it moves through the resin. However, the loads experienced by the print platform can also be dependent on the rate of movement of the print platform through the resin, and therefore the effective viscosity of the resin can be more accurately determined when feedback from multiple sensors (e.g., including print platform velocity and acceleration sensors, and not only bulk resin temperature sensors) are utilized. In some embodiments, the geometry of a part being printed is taken into account when using the above combinations of sensors and PRPS movements to determine resin viscosity.

The limits imposed on the maximum acceptable accelerations and velocities of vertical elevator moves can be further enhanced by knowledge of the geometry that is currently being created at the polymer interface. For example, large cross-sectional areas will increase the damping effect of moving the part and the print tray through the resin, whereas smaller cross-sectional areas will reduce this effect. In this example, elevator arm load and resin tub vertical displacement feedback can be used in conjunction with the z-stage acceleration, position and velocity feedback to understand additional system behavior during a print run, and provide corrective actions in a closed loop feedback system. For example, information from multiple of the sensors listed above can be used to determine if the system is behaving as modeled, and if not, then the system can correct the z-stage movement profiles to bring the desired operating speeds and membrane loads back within normal operating limits. Additionally, information from the sensors listed above can indicate if there is any impending anomalous behavior that may indicate the print process has failed, at which point the most economical course of action could be to halt the print job to avoid wasted resources or possible equipment damage.

In another example, information from multiple sensors is integrated into a closed loop feedback system in a PRPS to detect changing adhesion forces between the cured resin layer and the membrane. As these adhesion forces increase, the membrane could become deformed, or the printed layer could adhere to the membrane and not release at all. In some embodiments, the flexible nature of the membrane produces inaccurate or defective geometry in a printed layer as a result of radiant energy exposure when the polymer interface plane is at the wrong z-position. Detection and correction of such a situation using multiple sensors (e.g., z-stage position, movement direction, velocity and acceleration, resin bulk temperature, resin tub down force, resin tub vertical displacement, and elevator arm load sensor) can enable the print to continue without failure. In some cases, corrective actions can range from slowing down the z-stage move speeds to maintain adhesion (or delamination) loads within limits or pausing to allow the membrane and the resin tub to return to the required steady state positions before continuing the print job. Additionally, detection of adhesion loads and membrane deflections that are lower than anticipated could provide opportunities to increase the printing process speed in a similar manner.

In another example, a present PRPS can be equipped with an automatic resin dispensing system (e.g., system 1060 in FIG. 1M), containing an automatic resin dispenser that dispenses resin from one or more resin vats to the resin tubs of one or more PRPSs. The resin vat(s) can contain one or more sensors to measure the properties of the resin in the resin vat(s), and the automatic resin dispenser can dispense resin from resin vat(s) only when the resin meets certain criteria. For example, the resin vat(s) can contain temperature sensors and viscosity measurement systems (e.g., viscometers, or rheometers), and the resin can be dispensed only when the resin temperature and viscosity are within certain predetermined limits. A resin level sensor (e.g., element 55 in FIG. 1C) can be used in the automatic resin dispensing system to determine how much resin is in a given resin tub of a PRPS, and when a resin tub is full. Such an automatic resin dispensing system can also provide information about leaks, such as a leak in the membrane, or a hose or other component within the PRPS and/or automatic resin dispensing system, by comparing a predicted resin level in the resin tub (e.g., from a calibrated pump and/or dispense time) and the actual resin level from the resin level sensor. For example, if a membrane is leaking, then the resin level will be lower than expected, and this information can be fed back to the automatic resin dispense system or other system in the PRPS (e.g., to send notifications to an operator).

In another example, information from environmental sensors near a PRPS (e.g., sensor 70 in FIG. 1L) can be used to adjust a print recipe during a print run, or between print runs to improve the quality of the printed parts. The environmental sensors can acquire data from an entire factory, and/or an enclosure containing one or more PRPSs. Some non-limiting examples of environmental sensors are air pressure, temperature, humidity sensors, and "sniffer sensors" for detecting one or more odors and/or chemicals. For example, the PRPS can use environmental air pressure and temperature sensor data to determine how long to expose each layer, and/or over what distance to move the print platform between printed layers.

In some embodiments, environmental sniffer sensors that are capable of detecting one or more odors and/or chemicals in the environment near a PRPS can be used to provide information to adjust a print recipe during a print run, between print runs. For example, one or more sniffer sensors can be used with environmental temperature sensors to determine if resin(s) are conditioned (e.g., mixed and/or heated) correctly prior to being used for printing. In such an example, the resin can emit different smells (that are detectable by the sniffer sensors) at different temperatures thereby enabling the ability to determine if the resin is ready to be used. Using the feedback from the sniffer sensor(s), if the smell is not as expected, then additional heating and mixing can be applied before using the resin in a print run. Sniffer sensors can also be used with temperature sensors as a safety system. For example, if the exposure from a projection system is catastrophically stuck in a high-power setting causing an increase in the temperature around the PRPS, and simultaneously causing a smell to be emitted (e.g., a burnt smell) that is detectable by a sniffer sensor, then the information from these sensors can be fed back to the PRPS to abort the print run. Sniffer sensors and particle counter sensors can also be used in combination to determine if local air quality near or around the print engine is below a predetermined set of thresholds, and notifications can be sent out or a print job can be gated if the air quality is inadequate.

In another example, a combination of accelerometers can be used to detect an external impact event that may exceed a pre-determined limit for producing a part with an acceptable print quality. For example, a combination of g-force determined on the print chassis, vibration and/or g-force detected on the print spine can be used. In some cases, no single measured value would exceed a failure threshold, but when values from multiple of the above sensors are taken in combination they can indicate that a failure criteria has been exceeded.

In another example, the factory/house air pressure (e.g., used for pneumatics in print engine systems) can be measured, and used to gate the commencement of a print job. For example, if the house air pressure is too low, then the system will not allow a print job to take place, thereby saving resin and time spent on producing a part that may have low quality. The system can also prevent a print job from occurring if the pressure is exceedingly high and capable of damaging components (e.g., pneumatic systems, membranes, tension rings, resin tubs, etc.).

In another example, elevator arm force (or load) sensor data can be correlated to the expected movement of the z-stage. For example, programmed and actual (i.e., measured) z-stage motor current levels can be compared to elevator arm force data, and if there is a discrepancy in the actual versus the expected force on the elevator arms then the print recipe can be adjusted during a print run (e.g., the print could be slowed down, the exposure times changed, etc.), or the print job can be aborted (to save resin and time). For example, such a force discrepancy could indicate a problem with either the print engine (motor subsystem, clutch engagement issues, mechanical issues, etc.) or a part being printed. Such a discrepancy could also indicate premature wear on components/equipment, such as (but not limited to) lead screws and bearings.

In another example, a PRPS can perform an initial check to ensure subsystems related to the elevator arms, membrane tension system and/or motor are wired correctly by monitoring elevator arm force (or load) sensor data, or membrane tension system force sensor data, compared to commanded motor direction. For example, if the system sees unexpected force (e.g., magnitude and/or direction) when it commands the motor to move in a certain direction, it can then infer a problem with either subsystem (e.g., the elevator arms or motor system) and alert a technician and/or operator to check the wiring in the PRPS. In another example, the linear encoder system (e.g., elements 35 and 40 in FIG. 1B) can be used with the elevator arm force sensors to check the motor wiring.

In another example, one or more audible sensors (i.e., sensors capable of detecting sounds) coupled together with the elevator arms force (load) sensors can be used to determine the degree to which a printed part is sticking (or adhering) to the membrane. A part that is sticking to the membrane can emit sounds indicative of the degree to which the part is sticking to the membrane, and these sounds can be used in a closed loop feedback system to adjust the print recipe during the print run. For example, based on the stiction sound information from the audible sensor(s) and force data from sensors (e.g., load cells) on the elevator arms, various print parameters can be adjusted in real time (e.g., slowing down movements, or adjusting pump moves in real-time) to achieve desired print quality.

In another example, the combination of an audible sensor coupled together with an accelerometer or vibration sensor can be used to detect PRPS equipment wear. For example, if the lead screw in the PRPS makes a noise during movement while vibrating the entire z-stage, then it can be inferred that the lead screw or drive mechanism is wearing out on the print engine. In different embodiments, different noise signatures coupled together with different vibration/accelerometer signatures can be used to map to different wear points in the system.

In another example, airflow sensors and environmental temperature sensors can be used to monitor cooling systems within the image projection systems and surrounding print engine environments. For example, if an airflow sensor reads a lack of flow for the image projection system(s) coupled with an increase in temperature nearby, then the system(s) can react to protect the equipment (the image projection system(s), in this case). For example, the PRPS could go into a safe mode to protect against equipment overtempt conditions. Such cooling systems can also be used in an enclosure containing several PRPSs, and this cooling system can be controlled using the above combination of sensors.

In another example, feedback from one or more accelerometers and motor encoder sensor systems can be used to adjust movement velocities to avoid harmonics (i.e., mechanically resonant conditions) in the PRPS.

Figure 5:
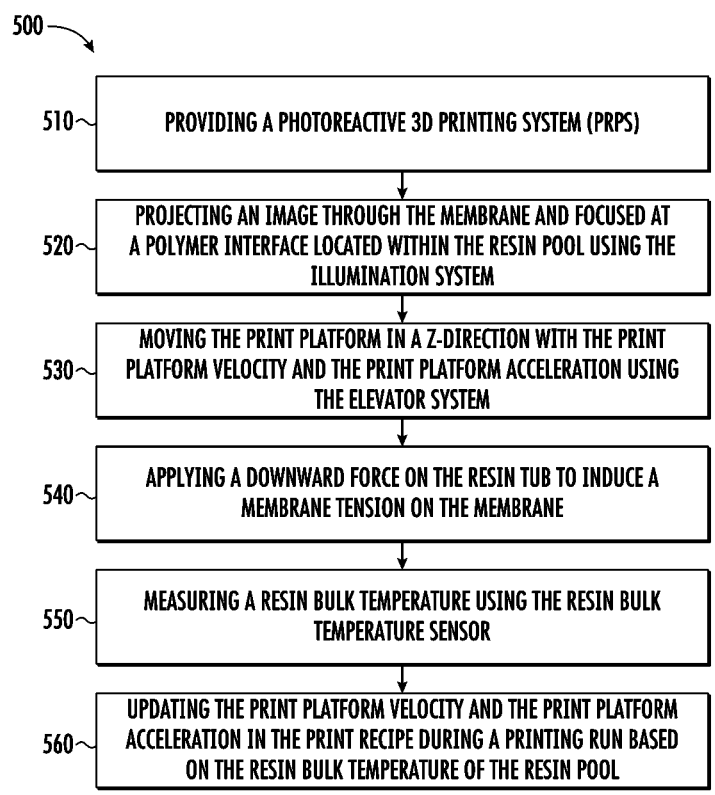
FIGS. 5 and 6 are flowcharts of methods for closed loop feedback in PRPSs, in accordance with some embodiments.

FIG. 5 is a flowchart of a method 500 for closed loop feedback in PRPSs, in accordance with some embodiments. In step 510, a PRPS is provided. The PRPS includes a chassis; an elevator system with elevator arms movably coupled to the chassis; a print platform mounted to the elevator arms; a resin tub; a membrane tension apparatus which applies a downward force on the resin tub; a resin pool confined by the resin tub and the membrane; an illumination system; a plurality of sensors; and a print recipe. The resin tub of the PRPS comprises a membrane, and the membrane rests on a physical tension element such that increasing downward force on the resin tub induces increasing tension on the membrane. The plurality of sensors includes a resin bulk temperature sensor, and optionally a resin tub vertical displacement sensor and an elevator arm load sensor. The print recipe comprises comprising information for each layer in a 3D printed part to be built on the print platform. The print recipe comprises one or more of build geometry, illumination energy, exposure time per layer, wait time between layers, print platform position, print platform velocity, print platform acceleration, resin tub position, resin tub force, resin chemical reactivity, and resin viscosity.

In step 520 of method 500, an image is projected through the membrane and focused at a polymer interface located within the resin pool using the illumination system. In step 530, the print platform is moved in a z-direction with the print platform velocity and the print platform acceleration using the elevator system. In step 540, a downward force is applied to the resin tub to induce a membrane tension on the membrane. In step 550, a resin bulk temperature is measured using the resin bulk temperature sensor. In step 560, the print platform velocity and the print platform acceleration in the print recipe are updated during a printing run based on the resin bulk temperature of the resin pool.

In other embodiments, the plurality of sensors in the PRPS provided in method 500 comprises one or more of the following: a z-stage position sensor; a z-stage velocity sensor; a resin tub vertical displacement sensor; an elevator arm load sensor; an accelerometer; a resin bulk temperature sensor; and a thermal imaging system. The PRPS provided in method 500 can additionally include any of the features of the PRPS embodiments described above (e.g., multiple image projectors, moving image projectors, etc.).

Figure 6:
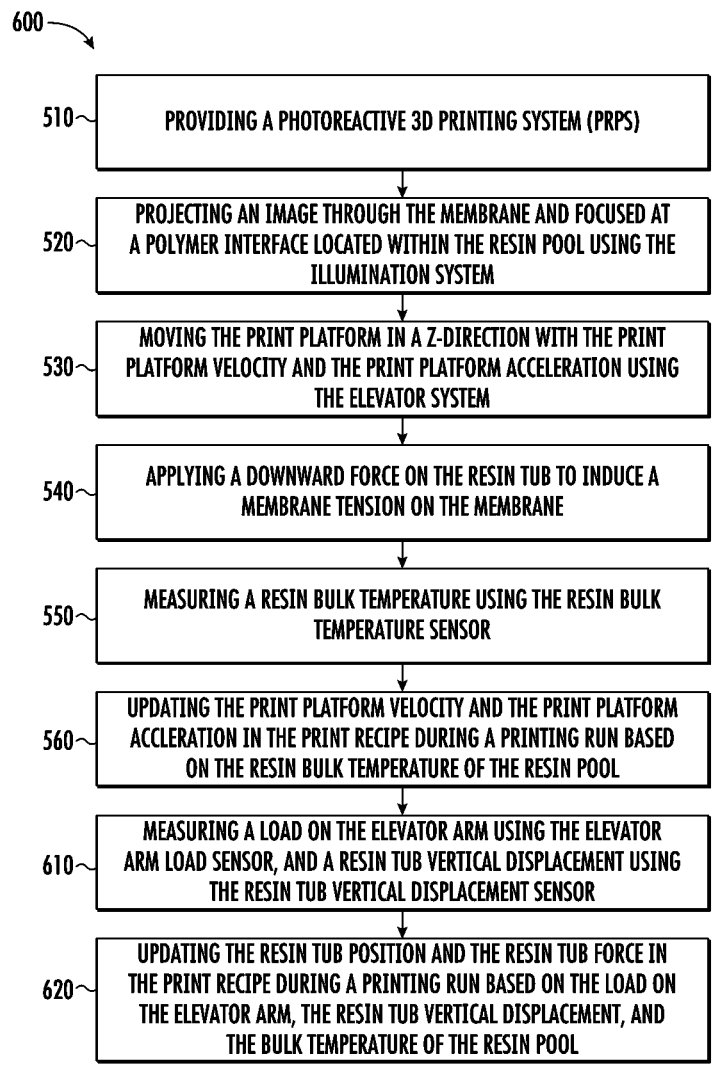

FIG. 6 is a flowchart of a second method 600 for closed loop feedback in PRPSs, in accordance with some embodiments. Steps 510-560 are the same as in the above method 500. In this method 600, the PRPS comprises the optional resin tub vertical displacement sensor and elevator arm load sensor. In step 610, a load on the elevator arm is measured using the elevator arm load sensor, and a resin tub vertical displacement is measured using the resin tub vertical displacement sensor. In step 620, the resin tub position and the resin tub force in the print recipe is updated during a printing run based on the load on the elevator arm, the resin tub vertical displacement, and the bulk temperature of the resin pool.

The methods 500 and 600 are non-limiting examples. Other embodiments similar to these example methods include a PRPS comprising one or more of the sensors described herein, using the sensors to perform one or more measurements, and using the measurements to adjust one or more elements of the print recipe described herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method, comprising:
   providing a photoreactive 3D printing system, comprising:
      a print platform, wherein the print platform is moveable;
      a resin tub, wherein the resin tub comprises a membrane;
      a tension apparatus;
      a volume of resin contained within the resin tub;
      an illumination system;
      a print platform force sensor; and
      a print recipe comprising information for layers in a 3D printed part to be built on the print platform, wherein the print recipe comprises one or more of build geometry, illumination energy, exposure time per layer, wait time between layers, print platform position, print platform movement, print platform velocity, print platform acceleration, resin tub position, resin tub force, resin chemical reactivity, and resin viscosity;
   projecting an image through the membrane at a polymer interface located within the volume of resin using the illumination system,
   moving the print platform in a z-direction;
   applying a tensioning force using the tension apparatus to induce a membrane tension on the membrane;
   measuring an amount of print platform force on the print platform using the print platform force sensor; and updating the print platform movement in the print recipe during a printing run based on the amount of print platform force on the print platform measured by the print platform force sensor.

2. The method of claim 1, wherein the tension apparatus further comprises a physical tension element configured to induce the membrane tension on the membrane.

3. The method of claim 1, wherein the tension apparatus further comprises a tension ring configured to induce the membrane tension on the membrane.

4. The method of claim 1, wherein the photoreactive 3D printing system further comprises an elevator system and a z-stage coupled to the elevator system, wherein the elevator system enables the print platform to move in the z-direction through action of the z-stage.

5. The method of claim 4, wherein the elevator system comprises elevator arms, wherein the elevator arms are coupled to the print platform, and wherein the print platform force sensor is coupled to the elevator arms.

6. The method of claim 4, wherein the photoreactive 3D printing system further comprises a z-stage position sensor configured to measure the print platform position, and wherein the updating the print platform movement in the print recipe further comprises updating the print platform movement in the print recipe during the printing run based on the print platform position measured by the z-stage position sensor.

7. The method of claim 1, wherein the photoreactive 3D printing system further comprises a thermal image sensor configured to measure a temperature distribution of the volume of resin, and wherein the method further comprises updating the illumination energy in the print recipe during the printing run based on the temperature distribution of the volume of resin measured by the thermal image sensor.

8. The method of claim 1, wherein the updating the print platform movement in the print recipe further comprises updating one or more of the print platform position, the print platform velocity, and the print platform acceleration in the print recipe.

9. A photoreactive 3D printing system, comprising:
a print platform, wherein the print platform is moveable;
a resin tub, wherein the resin tub comprises a membrane;
a tension apparatus,
a volume of resin contained within the resin tub;
an illumination system;
a print platform force sensor; and
a print recipe comprising information for layers in a 3D printed part to be built on the print platform, wherein the print recipe comprises one or more of build geometry, illumination energy, exposure time per layer, wait time between layers, print platform position, print platform movement, print platform velocity, print platform acceleration, resin tub position, resin tub force, resin chemical reactivity, and resin viscosity, wherein the photoreactive 3D printing system is configured to:
project an image through the membrane at a polymer interface located within the volume of resin using the illumination system;
move the print platform in a z-direction;
apply a tensioning force using the tension apparatus to induce a membrane tension on the membrane;
measure an amount of print platform force on the print platform using the print platform force sensor; and
update the print platform movement in the print recipe during a printing run based on the amount of print platform force on the print platform measured by the print platform force sensor.

10. The photoreactive 3D printing system of claim 9, wherein the tension apparatus further comprises a physical tension element configured to induce the membrane tension on the membrane.

11. The photoreactive 3D printing system of claim 9, wherein the tension apparatus further comprises a tension ring configured to induce the membrane tension on the membrane.

12. The photoreactive 3D printing system of claim 9, wherein the photoreactive 3D printing system further comprises an elevator system and a z-stage coupled to the elevator system, wherein the elevator system enables the print platform to move in the z-direction through action of the z-stage.

13. The photoreactive 3D printing system of claim 12, wherein the elevator system comprises elevator arms, wherein the elevator arms are coupled to the print platform, and wherein the print platform force sensor is coupled to the elevator arms.

14. The photoreactive 3D printing system of claim 12, wherein the photoreactive 3D printing system further comprises a z-stage position sensor configured to measure the print platform position, and wherein the updating the print platform movement in the print recipe further comprises updating the print platform movement in the print recipe during the printing run based on the print platform position measured by the z-stage position sensor.

15. The photoreactive 3D printing system of claim 9, wherein the photoreactive 3D printing system further comprises a thermal image sensor configured to measure a temperature distribution of the volume of resin, and wherein the photoreactive 3D printing system is further configured to update the illumination energy in the print recipe during the printing run based on the temperature distribution of the volume of resin measured by the thermal image sensor.

16. The photoreactive 3D printing system of claim 9, wherein the updating the print platform movement in the print recipe comprises updating one or more of the print platform position, the print platform velocity, and the print platform acceleration in the print recipe.

* * * * *